United States Patent
Bailey et al.

(10) Patent No.: US 11,917,935 B2
(45) Date of Patent: Mar. 5, 2024

(54) SEED TREATER WITH BAFFLES AND METHOD OF TREATING SEEDS USING SAME

(71) Applicant: Monsanto Technology LLC, St. Louis, MO (US)

(72) Inventors: Richard Bailey, Highridge, MO (US); Damien Douglas Brewer, Dardenne Prairie, MO (US); Vallabh Makadia, St. Louis, MO (US); Michael Francis Migliazzo, Chesterfield, MO (US); Daniel James Seyer, Ballwin, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/754,298

(22) PCT Filed: Sep. 30, 2020

(86) PCT No.: PCT/US2020/053539
§ 371 (c)(1),
(2) Date: Mar. 29, 2022

(87) PCT Pub. No.: WO2021/067433
PCT Pub. Date: Apr. 8, 2021

(65) Prior Publication Data
US 2022/0346306 A1 Nov. 3, 2022

Related U.S. Application Data

(60) Provisional application No. 62/910,885, filed on Oct. 4, 2019.

(51) Int. Cl.
*A01C 1/06* (2006.01)

(52) U.S. Cl.
CPC ..................... *A01C 1/06* (2013.01)

(58) Field of Classification Search
CPC .......................................... A01C 1/06
See application file for complete search history.

(56) References Cited

U.S. PATENT DOCUMENTS

| 6,582,516 B1 | 6/2003 | Carlson |
| 2006/0236925 A1 | 10/2006 | Lund |
| 2016/0044954 A1* | 2/2016 | Dunnebier ............. B01F 27/86 |
| | | 118/19 |
| 2016/0198622 A1 | 7/2016 | Mehrkens |

OTHER PUBLICATIONS

International Search Report and Written Opinion for corresponding PCT Application No. PCT/US2020/053539, dated Dec. 15, 2020, 7 pages.

* cited by examiner

*Primary Examiner* — Joshua D Huson
*Assistant Examiner* — Spencer T Callaway
(74) *Attorney, Agent, or Firm* — Paul D. Tietz; Gale Wesley Starkey

(57) ABSTRACT

A seed treater includes a baffle which includes a fin that is selectively movable to adjust an extent to which the fin extends into a mixing chamber during mixing of seeds and a seed treatment within the mixing chamber to facilitate mixing of the seeds and the seed treatment within the mixing chamber. The fin defines an internal flow passage configured to deliver forced fluid through the fin and into the mixing chamber.

20 Claims, 16 Drawing Sheets

SEED TREATER WITH BAFFLES AND METHOD OF TREATING SEEDS USING SAME

FIELD OF THE DISCLOSURE

The present disclosure relates to a seed treater with baffles and a method of treating seeds.

BACKGROUND

Agricultural seeds are often coated or treated with a combination of active ingredients before planting. In seed treatment processes, one or more active ingredients, such as biological or chemical agents, are formulated into a seed treatment formulation and applied to the seeds using a seed treater. A seed treater may be designed either for continuous or batch operation. Typically, a batch-type seed treater (i.e., continuous batch treater) includes baffles in a mixing chamber to facilitate mixing of the seeds and treatment formula. Conventionally, the baffles comprise fins which are fixedly secured within the mixing chamber. The fins, while sufficient to facilitate mixing of the seeds, may cause build-up of seed treatment formula within the mixing chamber, particularly adjacent to the fins. This build-up reduces the productivity of the seed treater by causing downtime, during which the seed treater is cleaned to remove the seed treatment formula build-up.

A wide variety of fungicides, insecticides, and pesticides are conventionally treated on commercial seed, typically via liquid formulations, and batch-type seed treaters are common in the industry because they allow flexibility in the treatment application methodology. This type of flexibility is desirable due to the large number of combinations of agrochemical components which may be treated on seed. The present disclosure has identified an unmet need in the art for a seed treatment apparatus that allows greater flexibility of operation.

SUMMARY

In one aspect, a seed treater having upper and lower ends and a vertical axis extending between the upper and lower ends generally comprises a treater body defining a mixing chamber in which seeds and seed treatment formulations are mixed. The treater body includes a stator having an annular upper inner surface extending around the vertical axis of the mixing chamber and defining an upper portion of the mixing chamber, and a rotor having a generally concave inner surface below the annular upper inner surface of the stator and defining a lower portion of the mixing chamber. The rotor is rotatable relative to the stator about the vertical axis of the seed treater so that seeds within the lower portion of the mixing chamber flow upward along the generally concave inner surface to the annular inner surface of the stator. A baffle is coupled to the treater body. The baffle includes a fin that is selectively movable relative to the treater body and the mixing chamber to adjust an extent to which the fin extends into the mixing chamber during said mixing of the seeds and the seed treatment within the mixing chamber to facilitate mixing of the seeds and the seed treatment within the mixing chamber.

In another aspect, a seed treater generally comprises a treater body defining a mixing chamber, having a vertical axis, in which seeds and seed treatment are mixed. The treater body includes a stator having an annular upper inner surface extending around the vertical axis of the seed treater and defining an upper portion of the mixing chamber, and a rotor having a generally concave inner surface below the annular upper inner surface of the stator and defining a lower portion of the mixing chamber. The rotor is rotatable relative to the stator about the vertical axis of the seed treater so that seeds within the lower portion of the mixing chamber flow upward along the generally concave inner surface to the annular inner surface of the stator. A baffle is coupled to the treater body and includes a fin configured to facilitate mixing of the seeds and the seed treatment within the mixing chamber. The fin defines an internal flow passage configured to deliver forced fluid through the fin and into the mixing chamber.

In yet another aspect, a method of treating seeds generally comprises loading seeds into a mixing chamber of a body of a seed treater having a generally vertical axis. The body including an upper stator having an annular inner surface extending around the vertical axis of the mixing chamber and defining an upper portion of the mixing chamber, and a lower rotor having a generally concave inner surface defining a lower portion of the mixing chamber. The lower rotor of the mixing chamber is rotated relative to the upper stator about the vertical axis so that the seeds within the mixing chamber flow upward along the generally concave inner surface to the annular inner surface of the upper stator. A seed treatment formulation is delivered into the mixing chamber, and at least one of: a baffle is retracted relative to the mixing chamber, and a baffle is extended relative to the mixing chamber.

BRIEF DESCRIPTION OF THE DRAWINGS

Corresponding reference characters indicate corresponding parts throughout the drawings.

DETAILED DESCRIPTION

Figure 1:
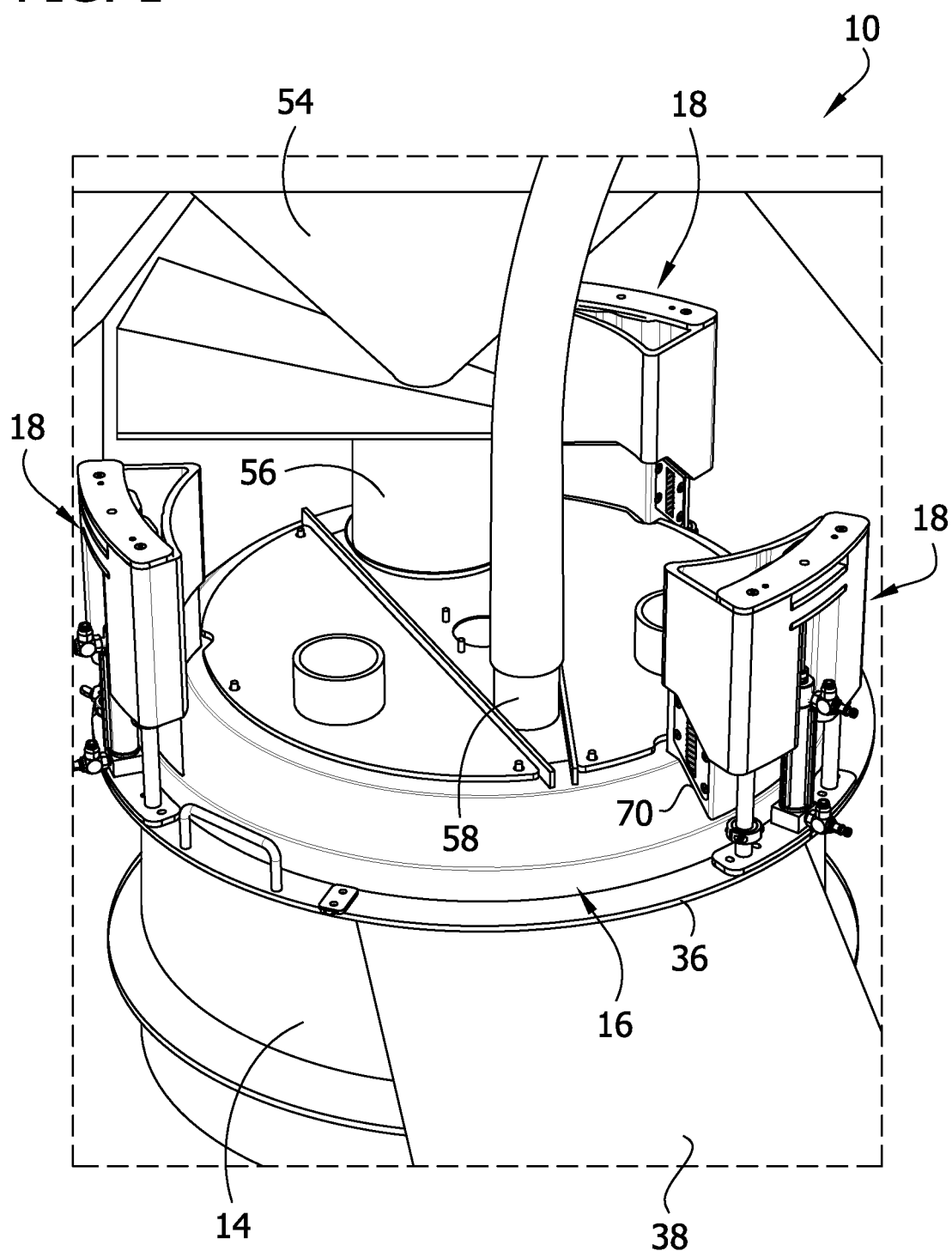
FIG. 1 is a perspective view of a seed treater constructed according to the present disclosure.

In general, the systems, devices, and processes described herein are suitable for applying a seed treatment formulation to the exterior surfaces of seeds.

Exemplary Seed Treater

Referring to FIGS. 1-4, one embodiment of a seed treater (e.g., a batch seed treater, such as a continuous batch seed treater) for applying one or more seed treatment components (e.g., treatment or seed treatment) to seeds of the present disclosure is generally indicated at reference number 10. In general, the seed treater 10 has upper and lower ends and comprises: a rotating portion ("rotor" 12) (FIGS. 2 and 3); a stationary portion ("stator" 14); a cover or lid, generally indicated at 16; and at least one baffle, generally indicated at 18. In the example Figures, three baffles are shown, but any number of baffles can be included in the present disclosure. Together, the rotor 12, the stator 14, and the lid 16 constitute a treater body defining a mixing chamber 20 having an open interior and having a vertical axis "VA" configured to receive seeds and treatment formulations therein. The baffles 18 facilitate mixing of the seeds and coating of seed treatment formulation on the seeds in the mixing chamber 20. The other components of the seed treater 10 may be generally known in the art of seed treaters and are explained in more detail below.

Referring still to FIGS. 1-4, the stator 14 includes a generally cylindrical annular wall 26 that is coaxial with the vertical axis VA of the mixing chamber. The annular wall 26 has an annular inner surface and an outer surface, relative to the vertical axis VA. Upper and lower flanges extend radially outward and transverse to the vertical axis VA from upper and lower ends, respectively, of the annular wall 26. The rotor 12 defines a lower portion of the mixing chamber 20 and is positioned within the lower portion of the stator 14. The rotor 12 has an inner surface that is generally concave or bowl-shaped with a generally circular, planar base (or bottom) and an angular or cone-shaped side wall. The base of the rotor 12 extends radially outward from and generally transverse to the vertical axis VA toward the annular wall 26. In the illustrated embodiment in the Figures, the base extends about 1/3 of the way to the annular wall 26 from the vertical axis VA. In other embodiments, the base may extend at other distances. The angular or cone-shaped side wall of the rotor 12 extends circumferentially about the vertical axis VA from the base in a generally upward and radially outward direction toward the annular wall 26. In the illustrated embodiment, the angular side wall extends toward the midpoint of the annular wall 26 (e.g., the upper end of the angular side wall is about half way between the upper and lower ends of the annular wall), such that an upper portion of the stator is above the rotor 12 and defines an upper portion of the mixing chamber 20.

The stator 14 defines an exit opening 36 in the upper portion thereof. As described in more detail below, the exit opening 26 is configured to allow the seeds to exit the mixing chamber 20 after the treatment formula has been applied to the seeds (e.g., the exit opening is, broadly, in fluid communication with the mixing chamber). As shown in FIGS. 1-4, the exit opening 36 is in communication with a seed collector 38 for receiving the seeds exiting the bowl 12. A door (not shown; illustrated schematically in FIG. 15) is configured to close the exit opening 36 while the seeds and treatment formula are being mixed together in the mixing chamber 20. The door is selectively operable, such as by a controller.

Figure 4:
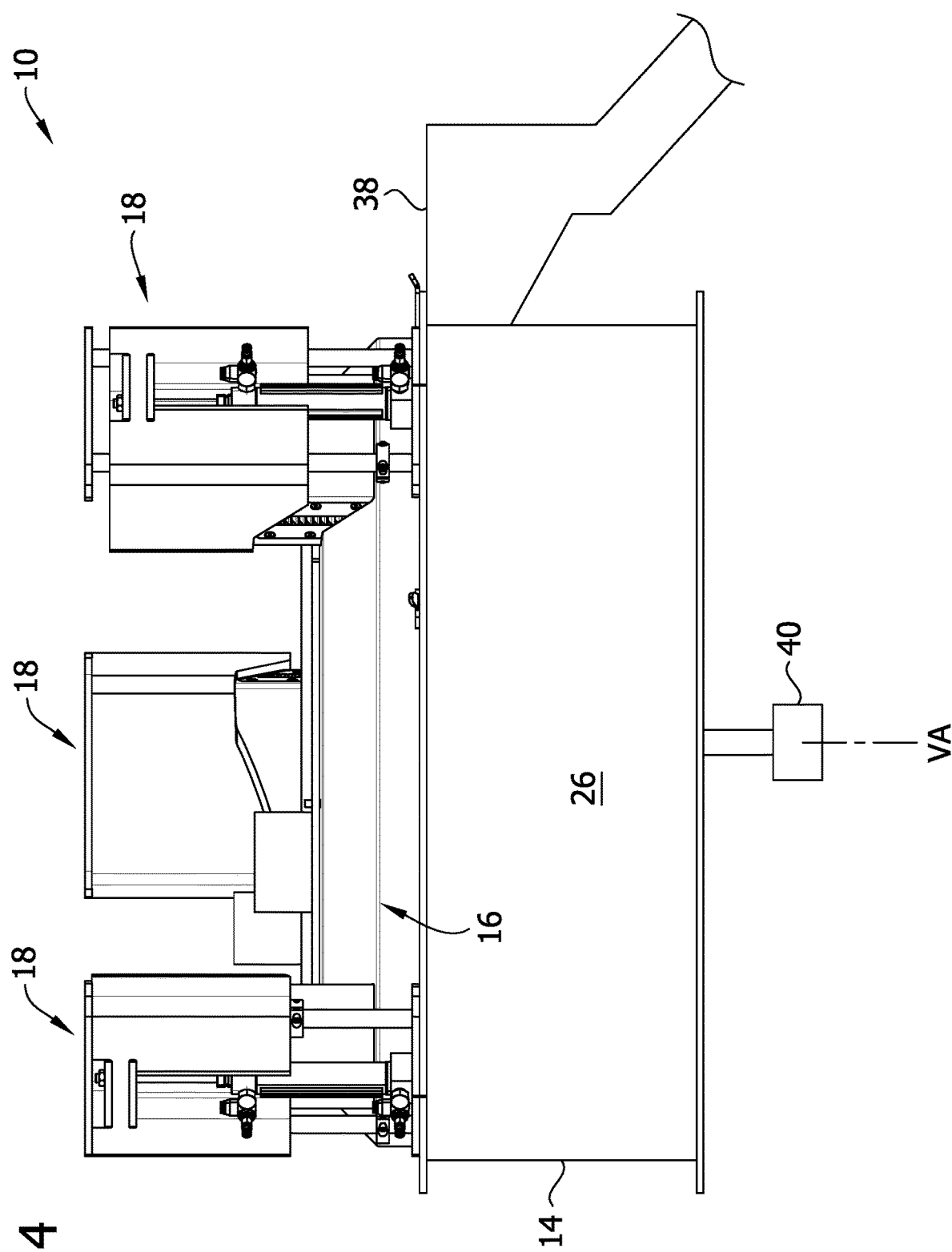
FIG. 4 is a front elevational view of the seed treater.
Figure 5:
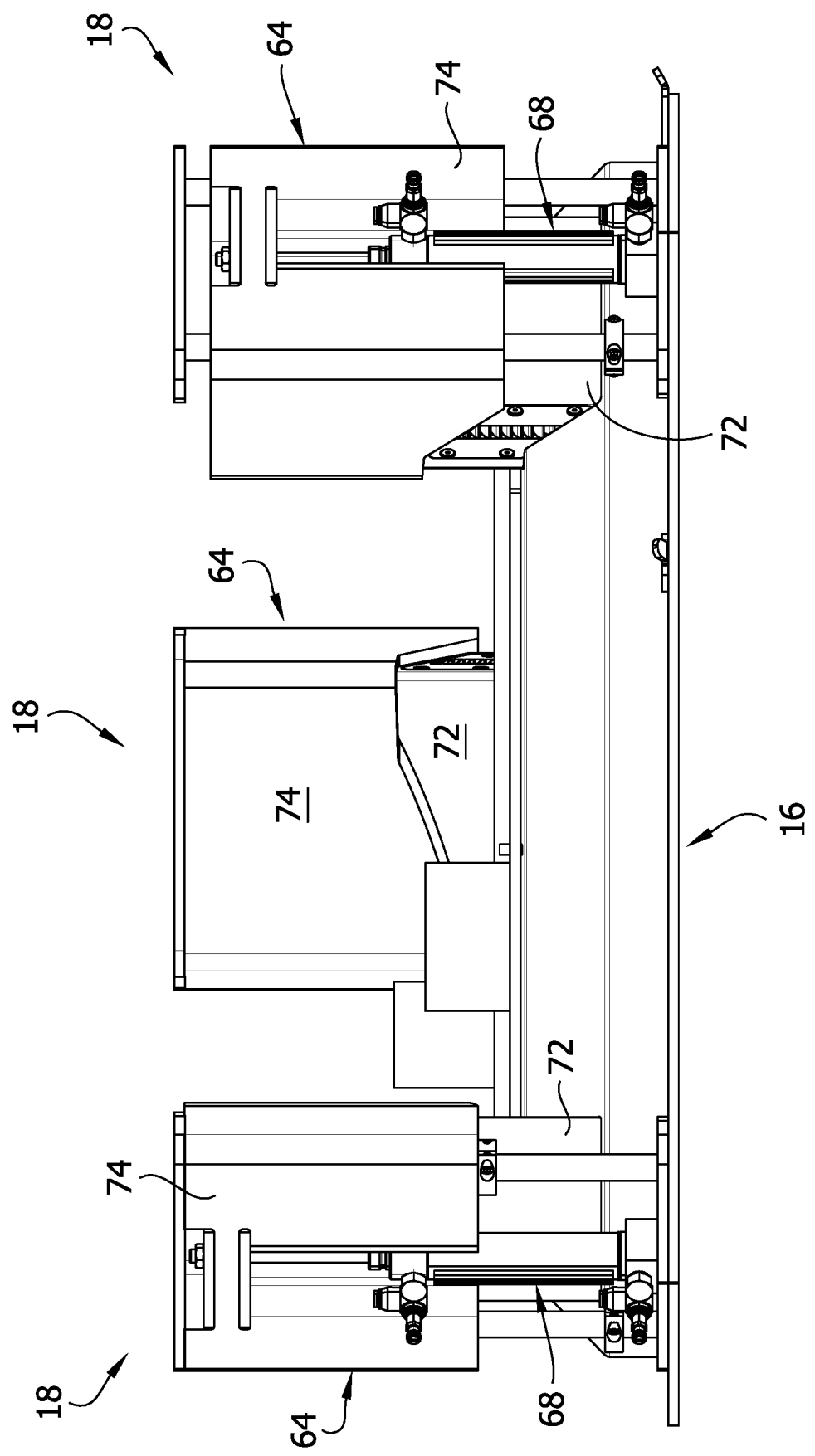
FIG. 5 is a front elevational view showing a lid and baffles coupled thereto.

Referring to FIG. 4, a driver, generally indicated at 40, drives 360° rotation of the rotor 12 about the vertical axis VA (e.g., rotational axis) relative to the stator 14 and the lid 16. The driver 40 may comprise a primer mover (e.g., a motor, such as an electric motor). The angular side wall of the rotor 12 is in a close fitting relationship with the annular wall 26 of the stator such that seeds and/or treatment cannot pass between the rotor and stator 14. The stator 14 and rotor 12 may have other shapes and configurations than described herein that are within the scope of the present disclosure.

Figure 2:
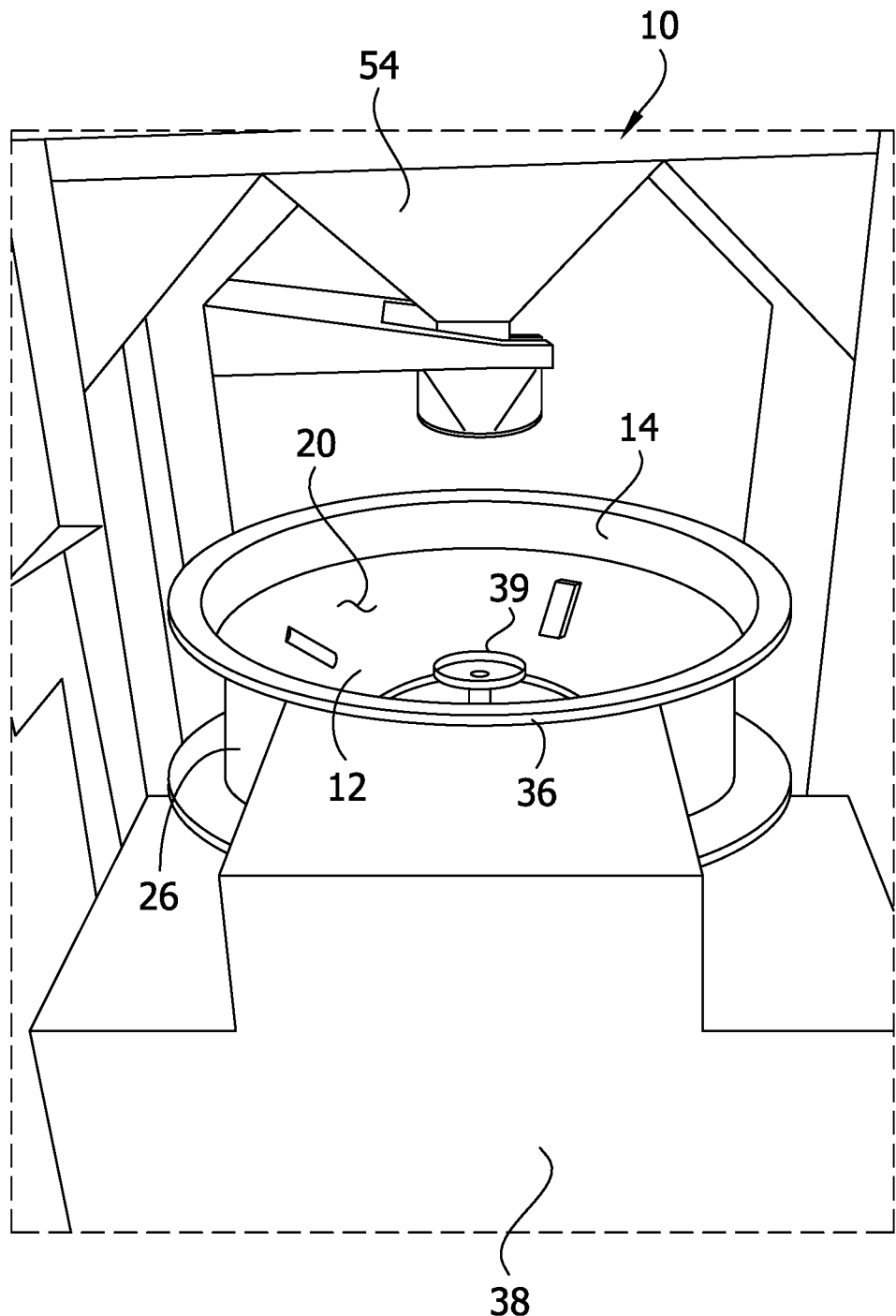
FIG. 2 is an enlarged view of FIG. 1, in which the lid and baffles of the seed treater are removed to show an interior of the seed treater.
Figure 3:
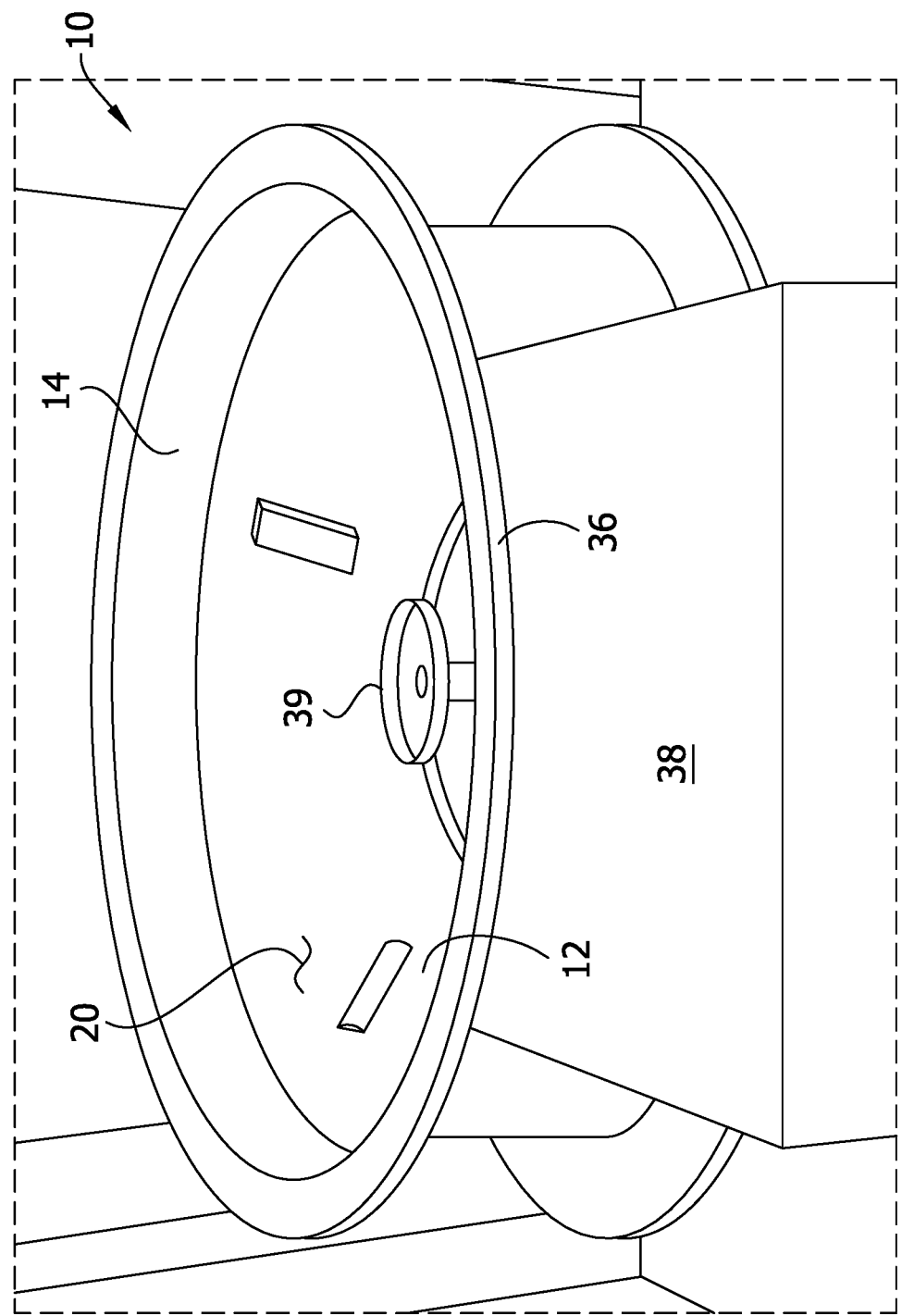
FIG. 3 is an enlarged view of FIG. 2.

As shown in FIGS. 2 and 4, a seed treatment applicator 39 of the seed treater 10 extends into the mixing chamber 20 through a bottom of the rotor 12. The seed treatment applicator 39 is configured to dispense the seed treatment formula into the mixing chamber 20. The seed treatment applicator 39 can dispense the seed treatment formula while the rotor 12 is stationary or rotating. Accordingly, the seed treatment applicator 39 can dispense treatment onto the seeds while the seeds are stationary or flowing within the mixing chamber 20. The seed treatment applicator 39 is fluidly connected to a source of seed treatment formula (not shown; illustrated schematically in FIG. 15). A pump or other mover is incorporated with the source of seed treatment formula to deliver the treatment to the seed treatment applicator 39. The seed treatment applicator 39 may be configured to deliver any suitable fluid or fluidizable treatment substance. For example, the seed treatment applicator 39 can be configured to deliver one or more of a treatment formula that is a liquid, a slurry, a powder, etc., examples of which are described below. The seed treatment applicator 39 may also be configured to deliver two or more different treatments simultaneously.

In one embodiment, the seed treatment applicator 39 is a rotating plate near the center of the mixing chamber 20 and configured to radially throw the treatment formula onto the seeds. The rotating plate 38 may be driven by the driver 40 or a separate driver. Other configurations of the seed treatment applicator 39 are within the scope of the present disclosure. For example, the seed treatment applicator 39 may dispense the treatment into the mixing chamber 20 via a spray, curtain, sheet, or fan that can create a more uniform and faster initial distribution of treatment formula between seeds than, for example, a rotating plate. For example, in one embodiment, the seed treatment applicator 39 is a spray applicator configured to spray the seeds that have spread out over the surfaces defining the mixing chamber (e.g., bed of seeds) via the centrifugal forces imparted by the rotor 12 to achieve a more uniform initial distribution of treatment formula. Still, in another embodiment, the seed treatment applicator 39 may include multiple treatment distribution heads (e.g., treatment outlets) that extend into the seeds contained within the mixing chamber 20 (e.g., seed volume) and deliver the seed treatment formula directly into the seed volume. Such a seed treatment applicator 39 may be desirable in large treatment loading conditions (such as 50 or more fluid ounces of treatment per 100 lbs. of seed) to achieve a high degree of initial seed-to-seed treatment uniformity. A more uniform initial distribution of treatment formulas between seeds results in a more uniform final distribution of treatment formula over the seeds when the seed treating process (e.g., mixing and drying) is completed. Other configurations of the seed treatment applicator are within the scope of the present disclosure. Moreover, other devices for delivering treatments are also possible.

In the illustrated embodiment, as shown in FIGS. 1 and 2, a seed loading chute 54 is in communication with a seed loading opening 56 of the lid 16. The seed loading chute 54 is configured to direct seeds into the mixing chamber 20. In one embodiment, the seed loading chute 54 includes a lid configured to be removed such that seeds can be placed into the seed loading chute and directed (e.g., fall) into the mixing chamber 20. A seed delivery device (not shown; illustrated schematically in FIG. 15) may be in communication with the seed loading chute 54 for automatically delivering seeds to the seed loading chute. For example, an auger or other type of seed delivery device may be disposed above the chute 54. The seed delivery device may be controlled by a controller.

Figure 6:
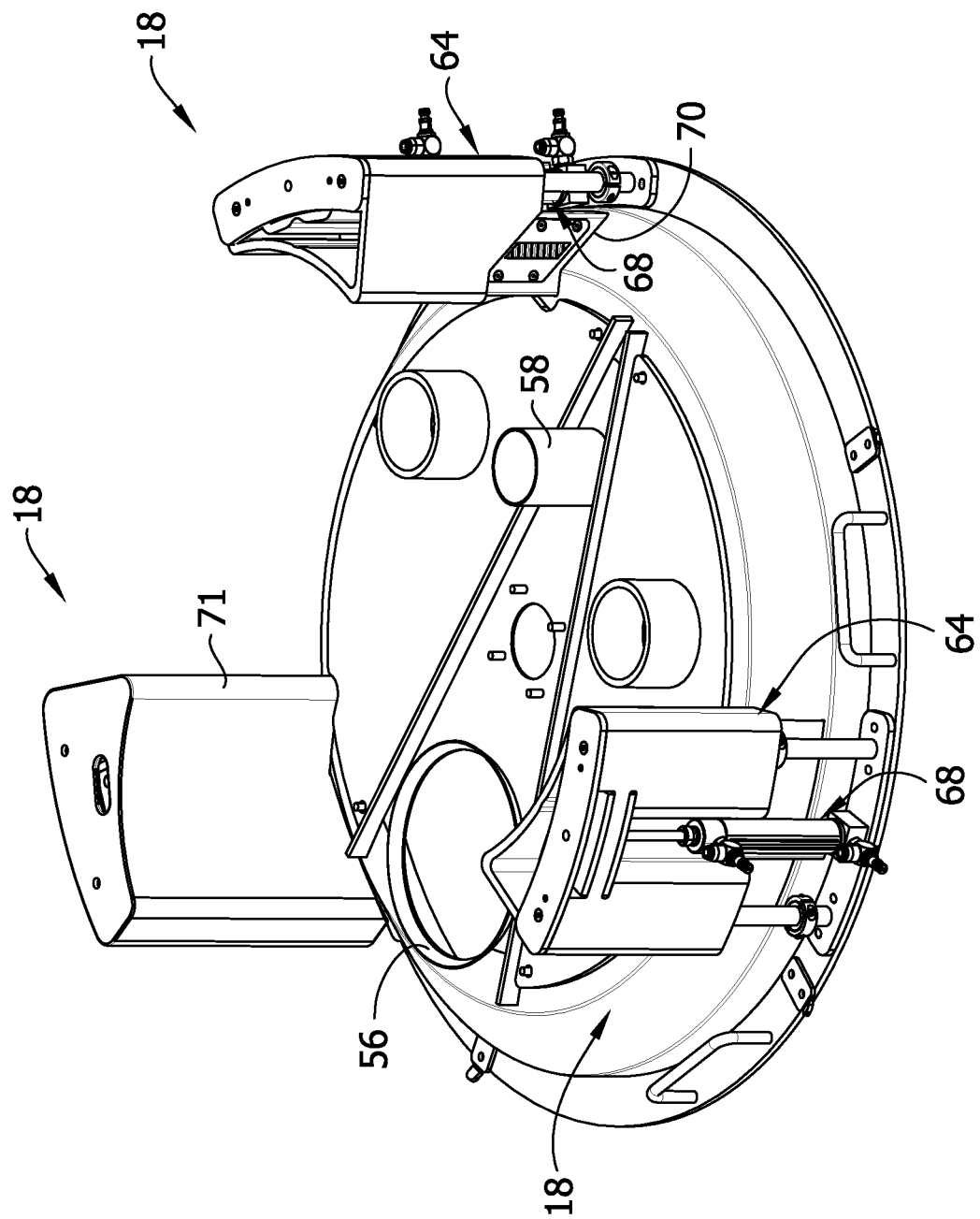
FIG. 6 is a perspective view of the lid and baffles of FIG. 5.
Figure 7:
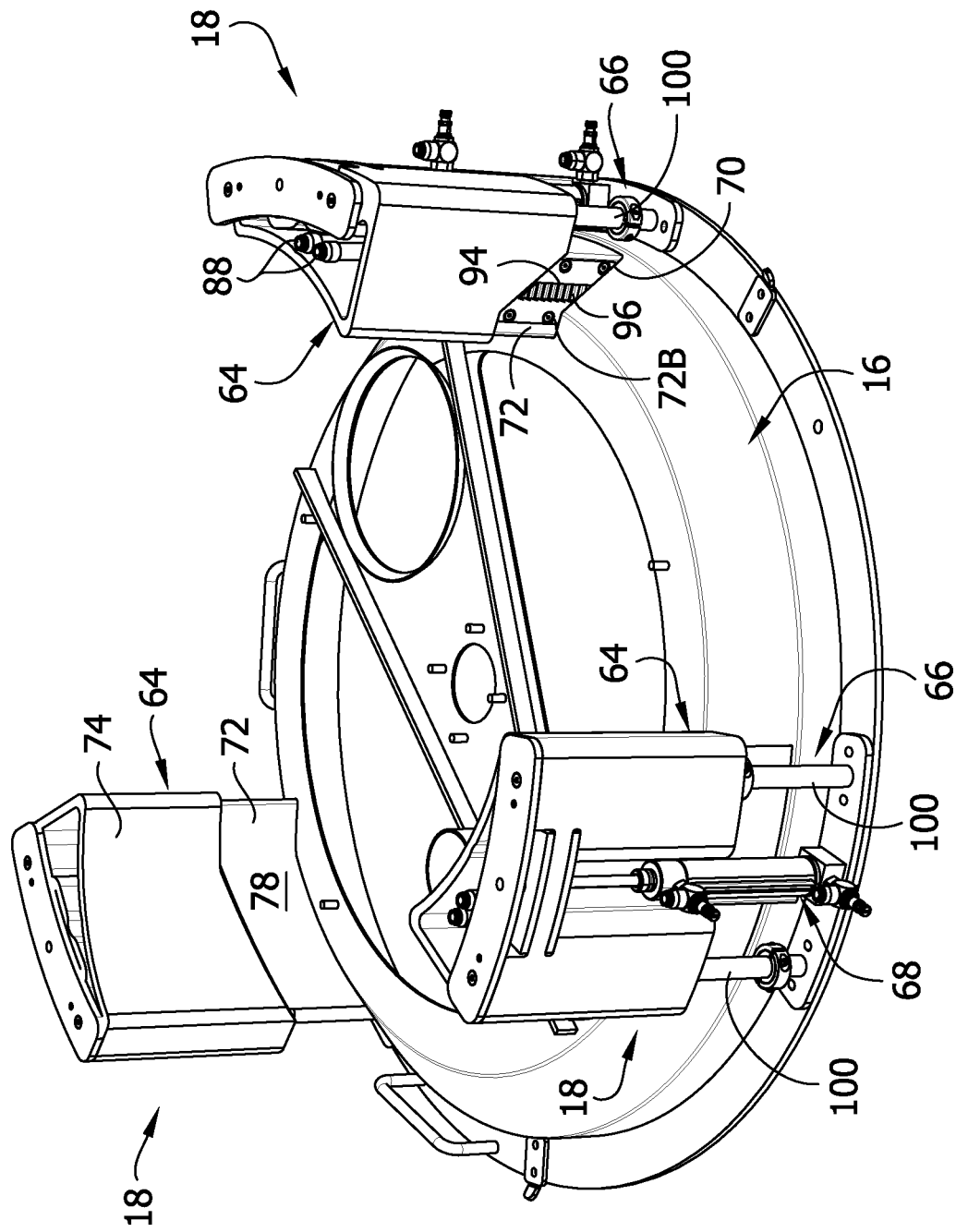
FIG. 7 is similar to FIG. 6.
Figure 8:
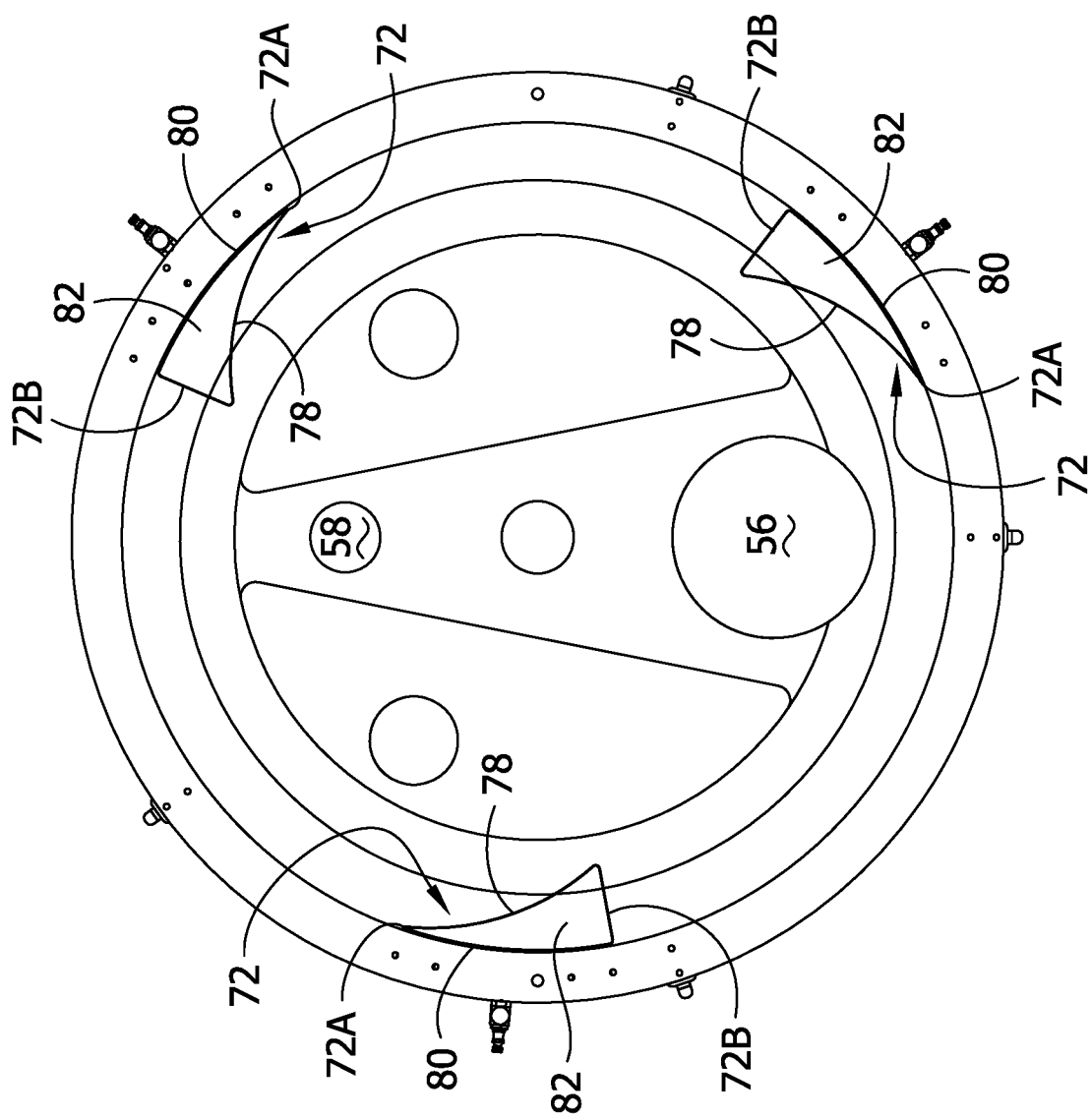
FIG. 8 is a bottom plan view of the lid and baffles of FIG. 6.

Referring to FIGS. 1 and 4, the lid 16 is configured to be mounted on the stator 14 over an open upper end of the mixing chamber 20. The lid 16 has a generally dome shape and is configured to overlie and engage the upper flange of the stator 14. The lid 16 covers the open upper end of the open interior 18 to enclose the mixing chamber 20. The lid 16 is releasably secured to the stator 14 with a plurality of clamps 60 fixed to the upper flange of the stator 14. As shown in FIG. 6, in addition to the seed loading opening 56, the lid 16 defines a seed treatment opening 58 configured to allow seed treatment (e.g., powders or granules) to be delivered into the mixing chamber 20.

Referring to FIGS. 5-8, in the illustrated embodiment the baffle(s) 18 are coupled directly to the lid 16 of the treater 10. In one or more other embodiments, the baffles 18 may be coupled to another component of the treater or otherwise associated with the mixing chamber 20 for performing the functions hereinafter described. Each of the baffles 18 are substantially identical, differing in circumferential location on the lid 16. Accordingly, description of a single baffle 18 is set forth hereinafter with the understanding that the following description applies equally to each of the other baffles.

Figure 9:
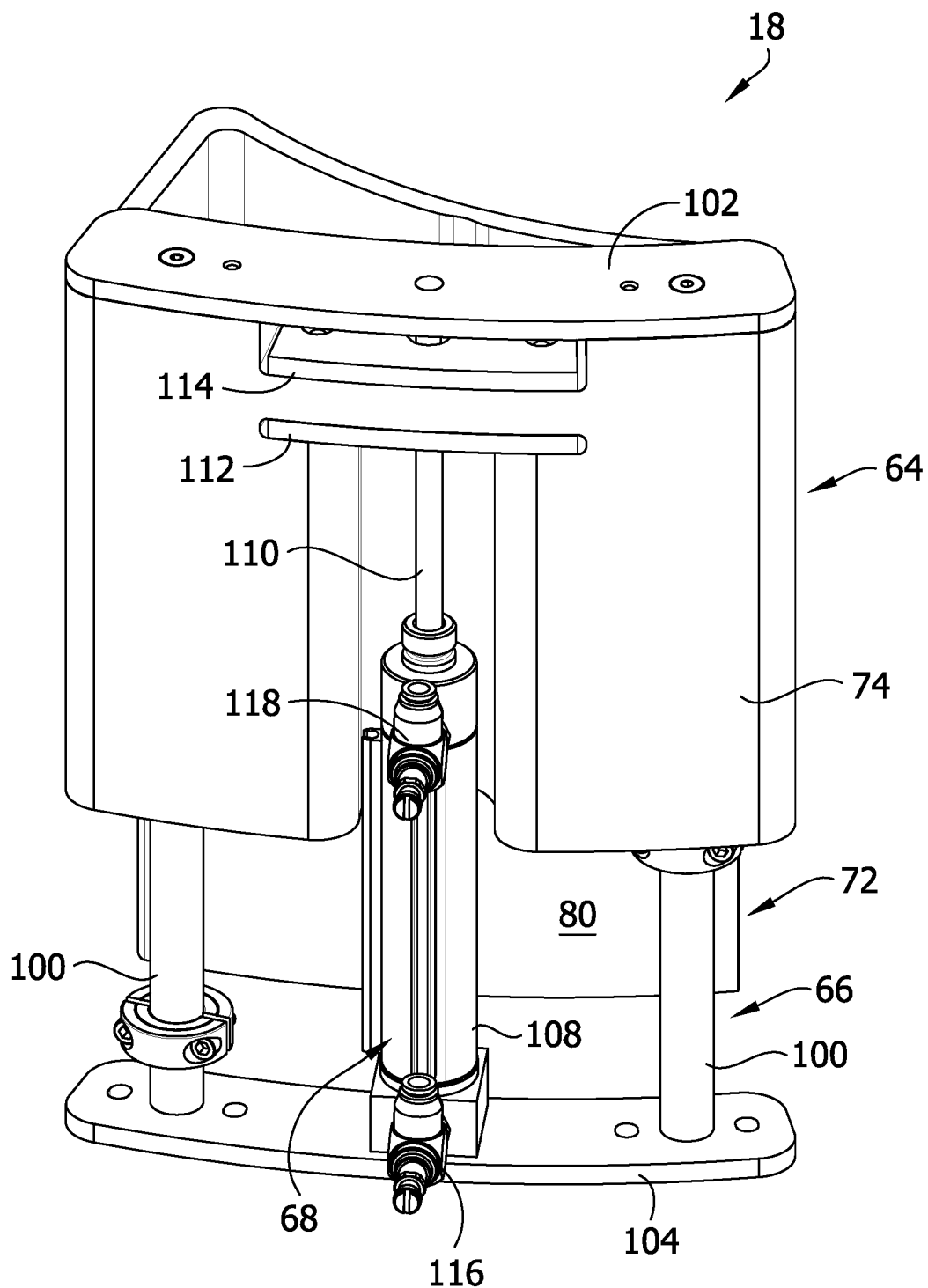
FIG. 9 is an enlarged, first perspective view of one of the baffles.
Figure 10:
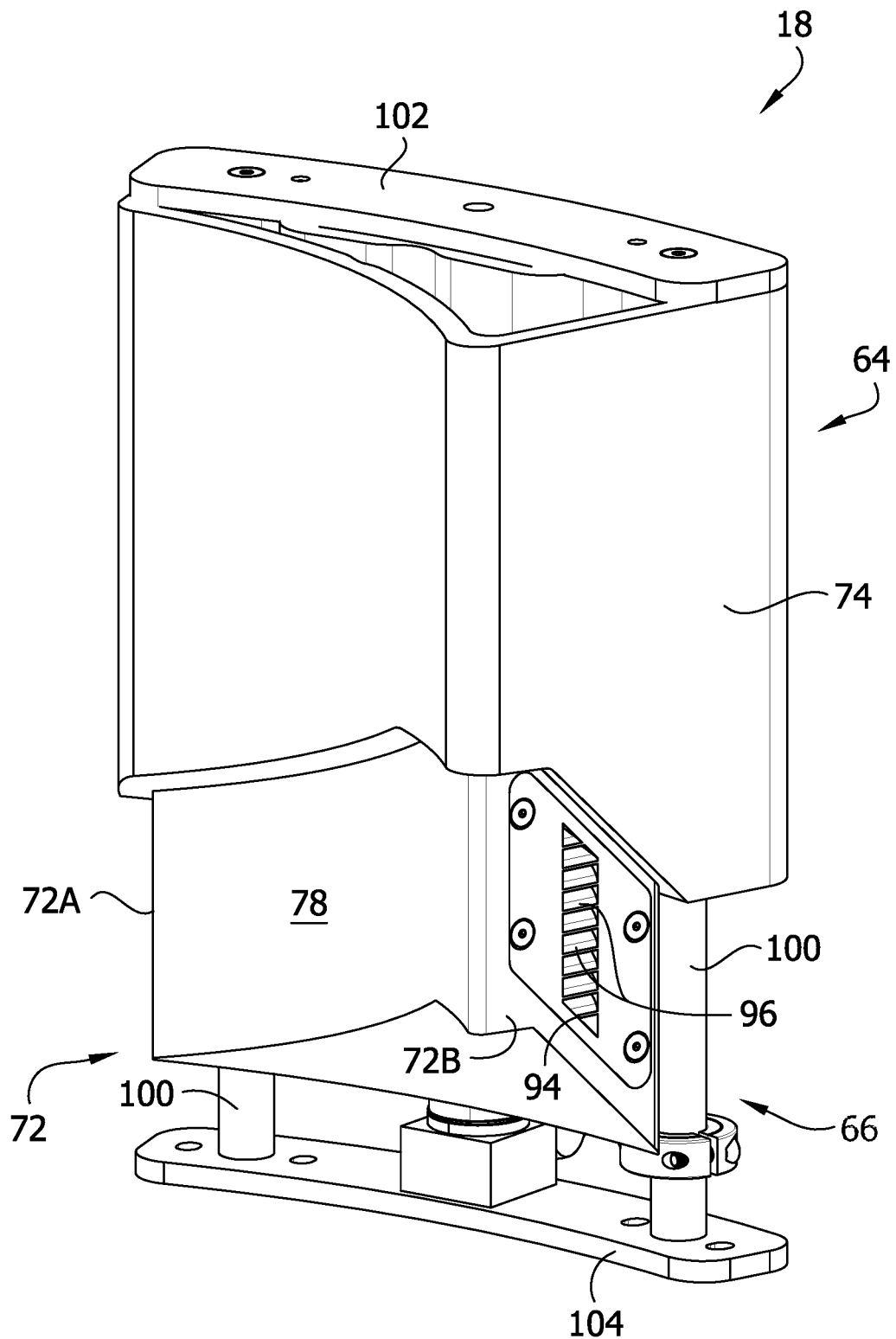
FIG. 10 is an enlarged, second perspective view of one of the baffles.
Figure 11:
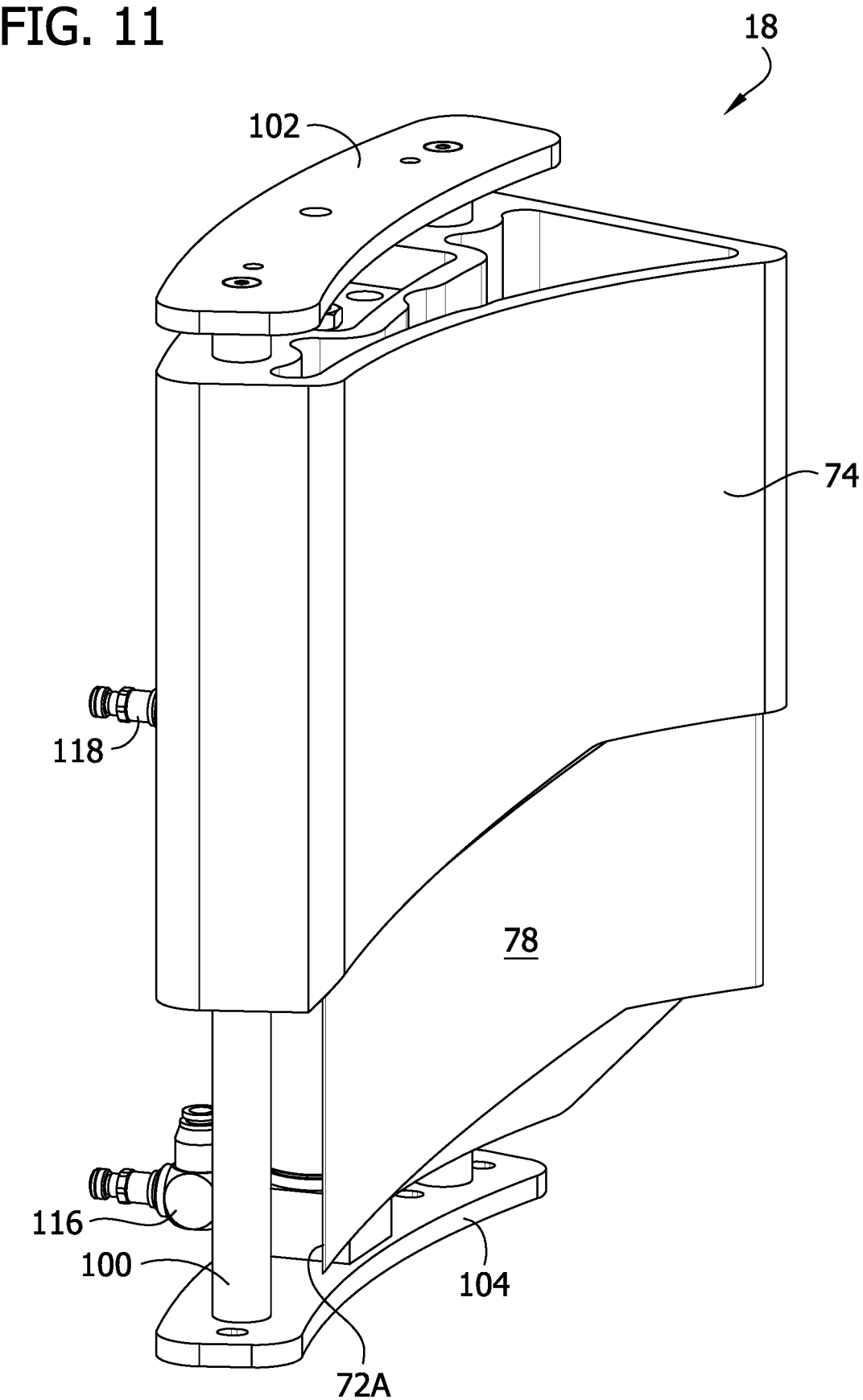
FIG. 11 is an enlarged, third perspective view of one of the baffles.
Figure 12:
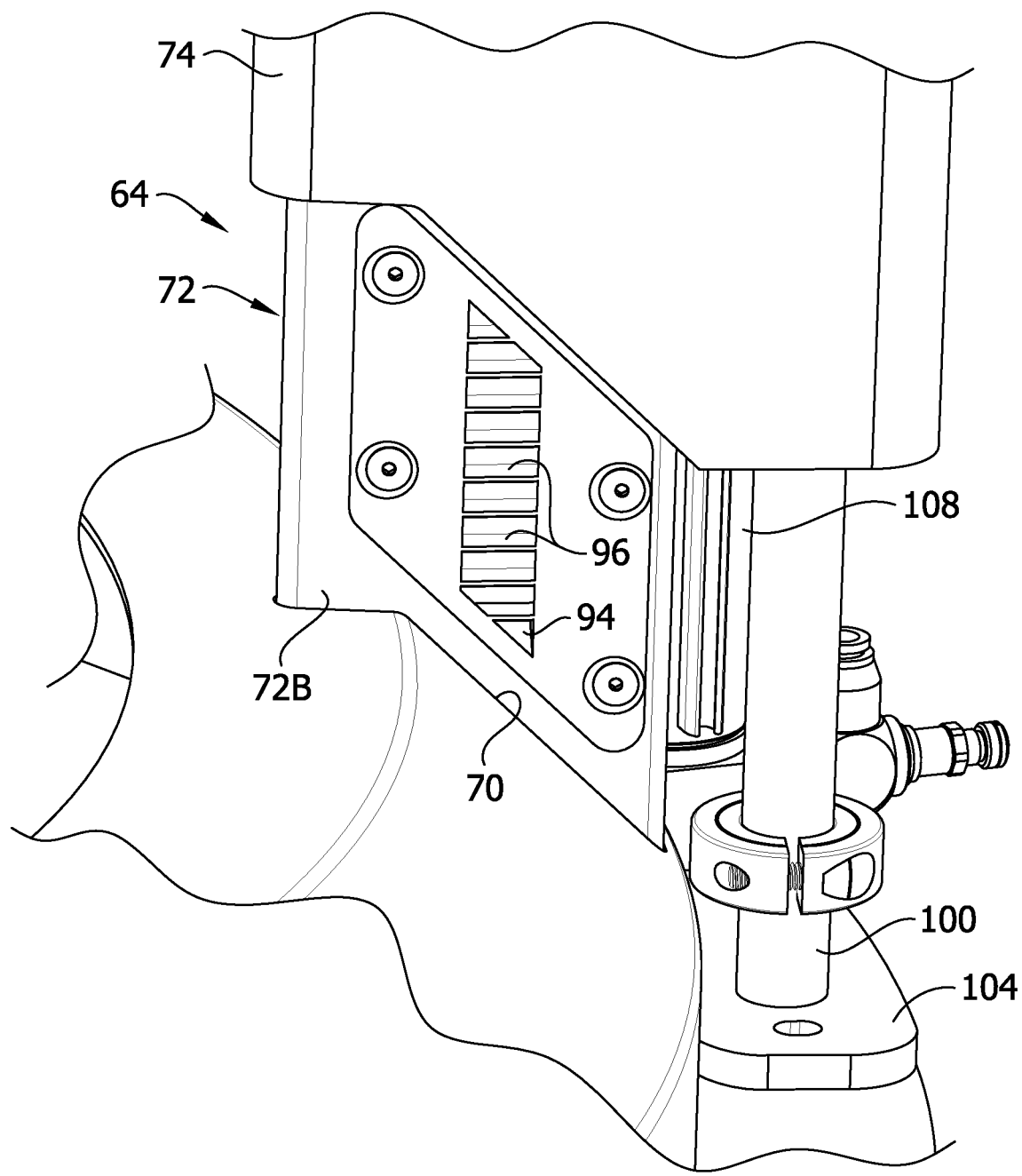
FIG. 12 is an enlarged, side elevation view of one of the baffles.

Referring to FIGS. 9-11, each of the baffles 18 includes a baffle body 64, a baffle track or guide 66, and a baffle actuator 68 operatively coupled to the baffle body and configured to move the baffle body along the track, and relative to the lid 16 and the stator 14, into and out of the mixing chamber 20. More specifically, the baffle actuator 68 is configured to selectively move the baffle body 64 upward and downward, into and out of the mixing chamber 20, respectively. For example, in the illustrated embodiment the baffle body 64 is insertable through a baffle opening 70 in the lid 16 and into the mixing chamber 20. Other ways of moving the baffle body 64 relative to the stator 14 during treatment of seeds within the mixing chamber 20 to facilitate mixing of seeds are possible and may be incorporated in one or more embodiments. As shown in FIG. 6, a baffle cover 71 may be disposed over the baffle 18 to protect the components of the baffle.

Referring to FIGS. 9-14, the illustrated baffle body 64 includes a fin 72 (e.g., a lower portion) and a stop 74 (e.g., an upper portion). The fin 72 of the baffle body 64 is movable through the baffle opening 70 and into the mixing chamber 20 to facilitate mixing of the seeds and seed treatment(s) and provide additional benefits and advantages, as explained in more detail when discussing an exemplary methods of seed treatment using the seed treater. In particular, the fin 72 is selectively movable relative to the treater body and the mixing chamber 20 to adjust an extent to which the fin extends into the mixing chamber during mixing of the seeds and the seed treatment within the mixing chamber to facilitate mixing of the seeds and the seed treatment within the mixing chamber. The fin 72 has a radially inner face 78 relative to the axis VA of the mixing chamber 20 that, depending on the direction of rotation of the rotor 12, curves generally inwardly toward the vertical axis along a circumferential length of the fin. In other words, the inner face 78 of the fin 72 curves radially inward from a leading circumferential end 72A of the fin toward a trailing circumferential end 72B of the fin. In this way, the fin 72 directs seeds flowing upward in the mixing chamber 20 by centrifugal force to flow radially inward and downward to facilitate mixing of the seeds and uniform coating of the seed treatment formula on the seeds.

Figure 16:
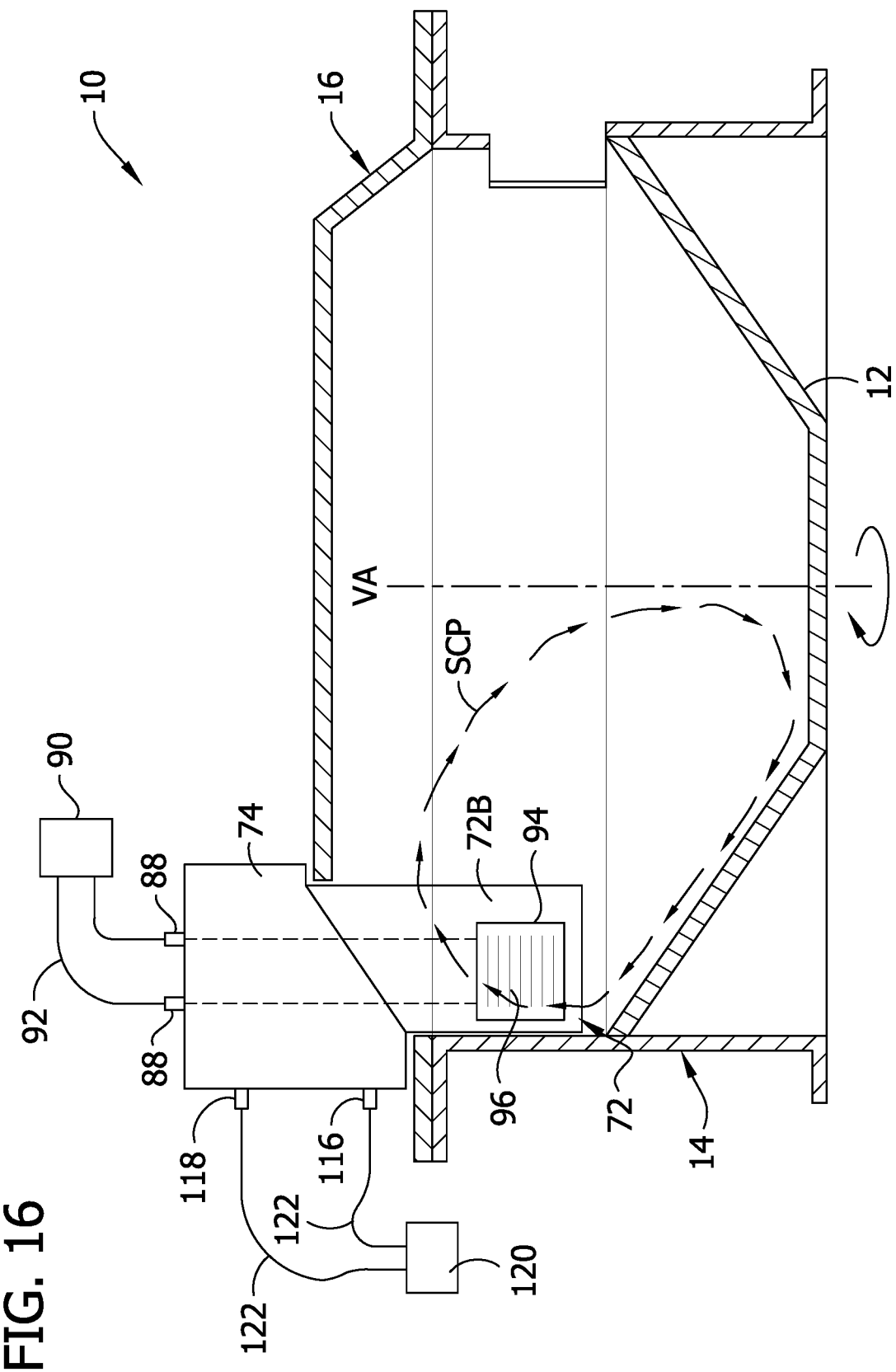
FIG. 16 is a schematic, partial cross section of a seed treater, showing a fin of one of the baffles in a deployed position in a mixing chamber of a seed treater.

As shown schematically in FIG. 16, when the illustrated fin 72 is at least partially deployed (e.g., at least partially extended) into the mixing chamber 20, a radially outer face 79 of the fin 72 generally opposes or is face-to-face with the inner surface of the upper portion of the stator 14 above the rotating rotor 12. In one embodiment, there is a radial gap between the radially outer face 79 of the fin and the inner surface of the upper portion of the stator. In one example, the width of the gap may be sized to inhibit seeds from entering between the radially outer face 79 of the fin and the inner surface of the upper portion of the stator 14. The width of the gap may be about 0.050 in (1.27 mm). In another example, the width of the gap may be sized to allow seeds to flow freely between the radially outer face 79 of the fin and the inner surface of the upper portion of the stator 14. The width may be from about 2 in (5.08 cm) to about 4 in (10.16 cm) or from about 2 in (5.08 cm) to about 3 in (7.62 cm). In another embodiment, the radially outer face 79 of the fin 72 and the inner surface of the upper portion of the stator 14 may be in face-to-face engagement or contact with one another. Also, when the fin 72 is fully deployed, the upper portion 74 of the baffle body 64 (e.g., a shoulder defined by the stop) engages the outer surface of the lid 16 and inhibits further downward movement of the baffle body. The stop or upper portion 74 may have other configurations or may be omitted in one or more embodiments. When the fin 72 is fully retracted to a position in which the entire fin is outside the mixing chamber 20, a bottom surface of the fin 82 is generally flush with an upper inner surface of the lid 16 to form a generally smooth, continuous surface. The fin 72 is configured to be deployed or extended into the mixing chamber 20 any amount between its retracted or non-deployed position to its fully deployed position. Thus, the extent to which the fin 72 extends into the mixing chamber 20—and thus the effective surface area of the curved inner surface 78 of the fin that is exposed to (i.e., contacts) the flowing seeds—are controllable. Moreover, the fins 72 are independently movable and may be controlled, such as by a controller, independent of one another.

Figure 13:
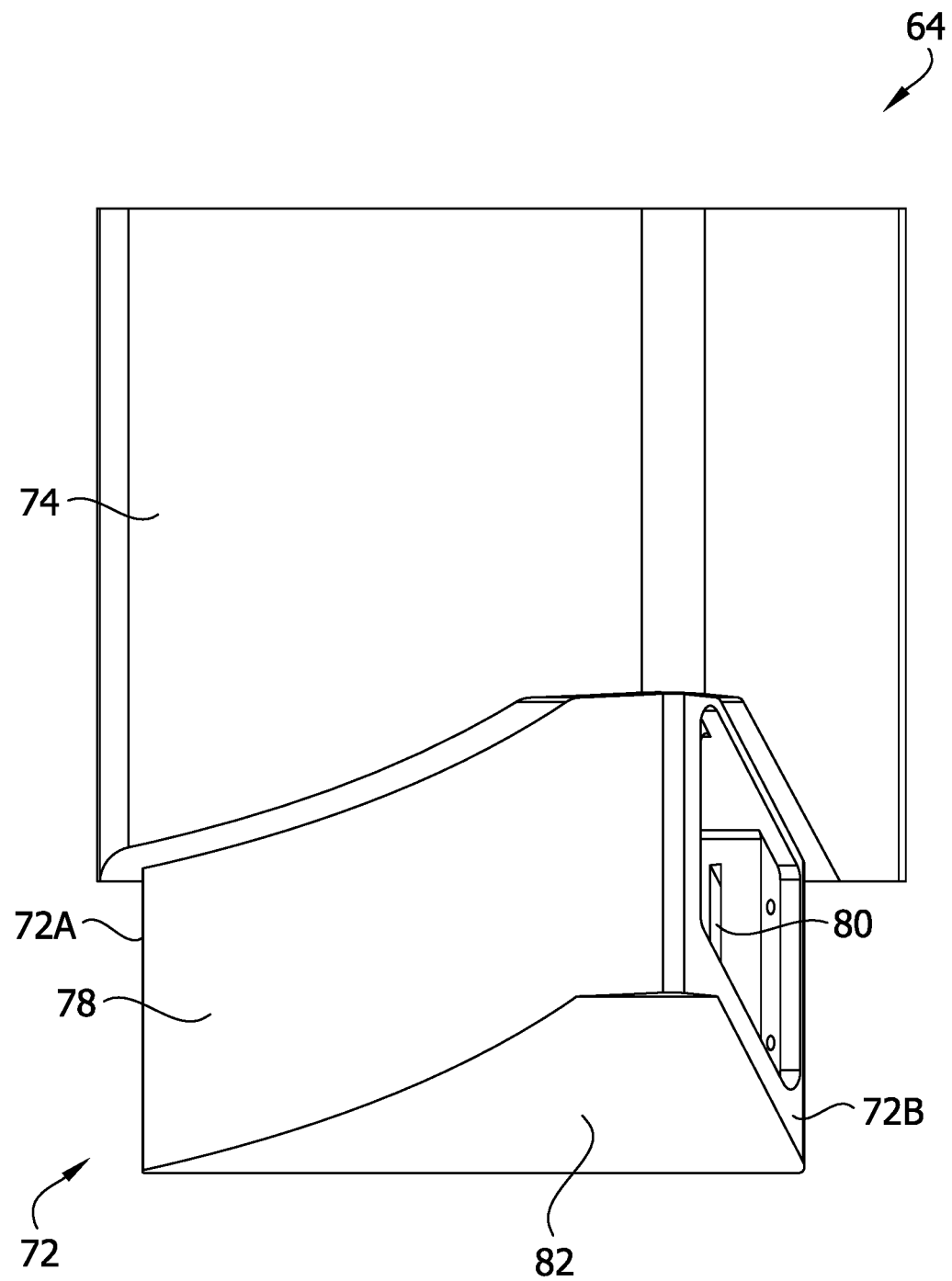
FIG. 13 is a front elevational view of a baffle body of one of the baffles.
Figure 14:
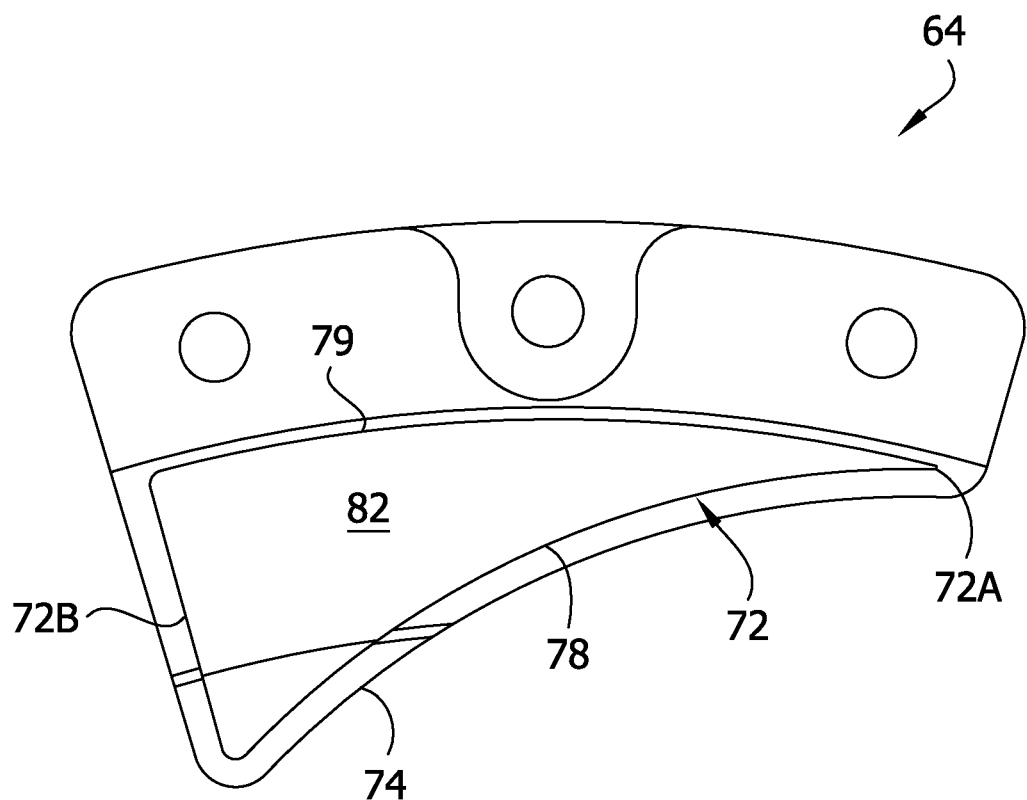
FIG. 14 is a bottom plan view of the baffle body.

Referring to FIGS. 13 and 16, in one or more embodiments (e.g., the illustrated embodiment), the fin 72 generally defines an internal manifold 80 defining an internal flow passage directing forced fluid (e.g., pressurized air or gas, such as supply-fan driven or compressed air or gas, or liquid, such as pumped liquid) through the fin 72 and into the mixing chamber 20 when the fin is at least partially deployed into the mixing chamber. Directing pressurized gas into the mixing chamber 20, such as simultaneously with rotating the rotor 12 and mixing the seeds, facilitates drying of the seeds in the treater 10, as explained in more detail below. In the illustrated embodiment, the manifold 80 includes at least one coupling (e.g., two couplings) 88 configured to couple to a source of pressurized gas 90, such as via tubes or conduits 92. The manifold 80 directs pressurized air through an outlet 94 located at the trailing circumferential end of the fin. Gas baffles 96 at the outlet further facilitate directing air downward toward the rotor 12 and/or along the inner surface of the upper portion of the stator 14. In this way, directing pressurized air through the manifold 80 and into the mixing chamber 20 reduces or inhibits the collection of treatment formulation generally at the junction of the trailing circumferential end 72B of the fin 72 and the inner surface of the stator 14, as also explained below.

Referring to FIGS. 9-11, the baffle guide 66 facilitates proper movement (e.g., upward and downward movement) of the fin 72 relative to the lid 16 and the stator 14. In the illustrated embodiment, the guide 66 includes at least one vertical guide rod 100 (e.g., two spaced apart guide rods) coupled (e.g., slidably coupled) to the baffle body 64. The guide rods 100 extend downward from and are secured to an upper plate 102, which may also act as an upper limit stop for the baffle body 64. In the illustrated embodiment, lower ends of the guide rods 100 are also secured to a lower plate 104, which is in turn secured to the lid 16. The illustrated vertical guide rods 100 extend through the stop or upper portion 74 of the baffle body 64, and not through the fins 72. The baffle body 64 is movable (e.g., slidably movable) along the guide rods 100 between the extended and retracted positions relative to the mixing chamber 20. The guide 66 may be of other configurations to facilitate proper movement of the baffle body 64 (e.g., fin 72) relative to the mixing chamber 20. For example, the guide rod(s) may be telescoping with an upper portion of the guide rod fixedly secured to the upper portion of the baffle body and a lower portion of the guide rod fixedly secured to the lid.

Referring still to FIGS. 9-11, the actuator 68 comprises a cylinder 108, such as a pneumatic cylinder, operatively coupled to the baffle body 64 (e.g., the upper portion of the baffle body) and configured to move the fin 72, relative to the mixing chamber 20 and the stator 14, between multiple positions from the retracted (e.g., non-deployed) to the extended (e.g., deployed) positions of the fin. The illustrated cylinder 108 is a double-acting cylinder, although in other embodiments the cylinder may be single-acting. A barrel of the cylinder 108 is fixedly coupled to the lid 16, and a piston rod 110 is fixedly coupled to the baffle body 64 (e.g., the upper portion of the baffle body). For example, the barrel may be secured to the lower plate 104, which is secured to the lid 16. The piston rod 110 includes a push plate 112 (e.g., a lower plate) and a pull plate 114 (e.g., an upper plate), each of which are secured to the baffle body 64, and more specifically, to the upper portion 74 of the baffle body. First and second control valves 116, 118 are coupled to the barrel and are configured to be coupled to a source of pressurized fluid 120, such as via tubes or conduits 122 (FIG. 16). When the first control valve 116 is open and the second control valve 118 is closed, the pressurized fluid moves an internal piston in the barrel in an upward direction, thereby moving the piston rod 110 and the baffle body 64 in the upward or retracted direction. When the first control valve 116 is closed and the second control valve 118 is open, the pressurized fluid moves the internal piston in the barrel in a downward direction, thereby moving the piston rod 110 and the baffle body 64 in the downward or extended (deployed) direction. The control valves 116, 118 may also be configured to vent to atmosphere when the fluid used for the cylinders 108 is gas (e.g., air). The actuator 68 may be configured to allow for selective adjustment of the depth or travel length during deployment of the fins. The actuator 68 may also be configured to adjust the rate and/or velocity at which the deployment and retraction of the fins take place. The illustrated actuator 68 moves the fin 72 linearly. In one or more embodiments, the actuator may be configured to rotate the fin or move the fin along another non-linear path.

Figure 15:
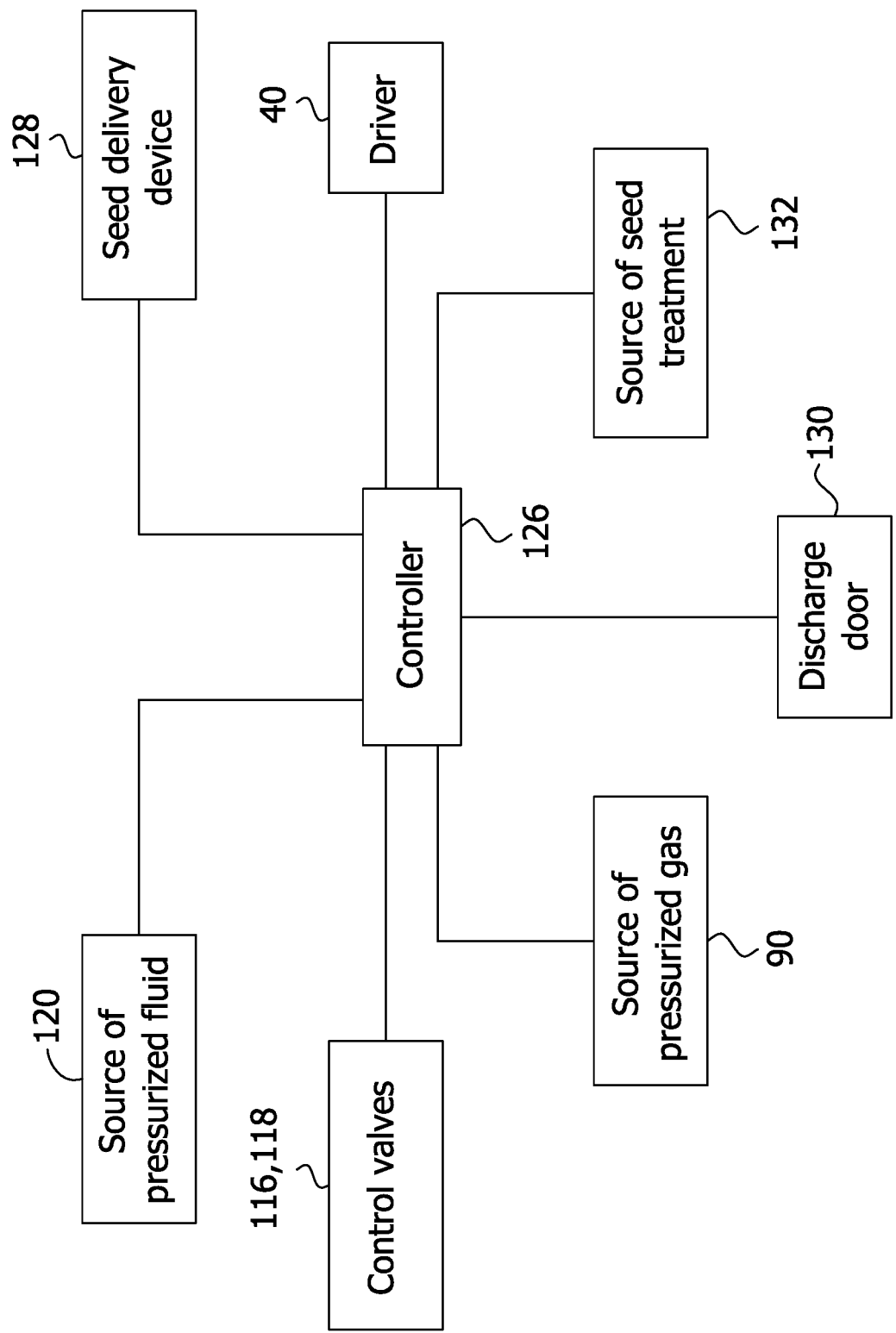
FIG. 15 is a schematic representation of the seed treater components communication with a controller.

In one or more embodiments, as shown in FIG. 15, the seed treater 10 includes a controller 126 (e.g., one or more processors and memory) configured to operate the seed treater 10 in a continuous, batch-type process. The controller 126 is programmed to operate one or more of: the driver 40, the chute valve, auger, or other seed delivery device 128, the baffle control valves 116, 118 (broadly, the baffle actuators), the source of pressurized fluid 120 for the baffles 18, the source of pressurized gas 90 for the manifold 80, and the discharge door 130 leading to the seed collector 38, and the source of seed treatment 132. Thus, the controller 126 is programmed to perform one or more of the following operations: rotate the rotor 12 at a selected speed and time, deliver a selected quantity of seed into the mixing chamber 20, control the positions of the baffles 18 relative to the mixing chamber 20 (e.g., between deployed and non-deployed positions), control the delivery of pressurized gas into the mixing chamber 20, deliver the treated seeds into the seed collector 38, and deliver seed treatment to the applicator 42 and into the mixing chamber 20. The controller 126 may control other operations of the seed treater 10.

It is understood that in other embodiments the fin may be of other designs, shapes, and/or configurations. In one or more embodiments, the retractable fins may comprise an elongated flat plate or a plurality of flat plates welded or otherwise fastened to one another. In still other embodiments, the retractable fins may comprise a curved plate or multiplicity of curved plates welded or otherwise fastened together. In these types of embodiments, the retractable fins may be movable in a vertical direction through openings in the uppermost portion of the treater body, such as the lid. Such openings may be adapted specifically to the longitudinal cross-section of the retractable fins, such that the clearance is smaller than the narrowest seed dimension expected during normal operation of the seed treater. This dimension may include in consideration any breakage or debris formed during normal operation of the seed treater. In some embodiments, the majority or entirety of the retractable mixing element body remains within the treater body at all times. In this type of embodiment, the stator wall extends higher than the seed stock is expected to reach during normal treater operation, at the specified seed stock loading and rotor speed.

Exemplary Seed Treatment Process

Referring to FIG. 16, the illustrated seed treater 10 is configured to mix (e.g., agitate) the seeds and treatment formulation received in the mixing chamber 20 to evenly apply the treatment formulation to substantially all of the seeds in the seed treater 10. Seed-to-seed mixing is accomplished by the random contact between seeds and the relative seed motion caused by the rotation of the rotor 12 and the fins 72 redirecting the flowing seeds. A seed circulation path "SCP" extends radially outward from the vertical axis VA (e.g., rotational axis) in all directions along the concave surface of the rotor 12 toward the stator 14. Accordingly, the recirculating seed circulation path SCP (e.g., flow of seeds) extends upward along the generally concave surface of the rotor 12, along the fins 72, and then downward from the annular wall 26 toward the base (e.g., bottom) of the rotor at an inward location spaced from the annular wall.

In one example of a seed treatment process, seed is first loaded into the seed treater 10 while the rotor 12 is being rotated, for example. Each of the baffles 72 are in the retracted (e.g., non-deployed) positions, such that all surfaces above the rotor 12, and below the expected highest point of seed mixing, are substantially smooth, at least on the scale of an individual seed. After a period of time of rotating the quantity of seeds (e.g., 1 second to 10 seconds), a mixture (e.g., liquid), or subset thereof, of the seed treatment formulation begins to be applied to the seeds by the seed treatment source 132 and the seed treatment applicator 42 located within the seed treater 10. In one embodiment, the application of the seed treatment formulation coincides with (i.e., is generally simultaneously with) the deployment of one or more of the fins 72 into the mixing chamber 20. The fins 72 remain in the deployed positions for a selected period of time (e.g., between 10 seconds and 20 seconds) to facilitate mixing. In one example, the pressurized air from the source of pressurized gas 90 is delivered through the manifold 80 and into the mixing chamber 20 during mixing while the fins 72 are deployed. The flow of forced fluid through the fins 72 is generally "co-current" with or in the same direction as the flow of seeds during mixing. The fins 72 may then be retracted to their positions above the seed circulation path SCP, thereby facilitating cleaning and reduction in treatment formulation build-up on the stator 14. The pressurized air may also be used during discharge of the seeds to facilitate the flow of seeds out of the mixing chamber 20.

In one example, when applying a second seed treatment formulation, which may be based upon prior determination or upon interruption of the treatment sequence by process feedback, the baffles 18 are deployed, immediately followed by a second application of treatment formulation. These secondary treatment formulations can include finishing agents and polymeric binders. After mixing of the secondary treatment components (e.g., between 5 seconds after application and 10 seconds after application), the treated seed is discharged. The pressurized air may also be used during discharge of the treated seeds to facilitate the flow of seeds out of the mixing chamber 20.

One advantage of the seed treater 10 described herein is the reduction in the build-up of seed treatment formulation in the mixing chamber 20, which would require cleaning and downtime. The retraction of the fins 72 after the seed treatment reduces or inhibits the build-up of seed treatment formulation on the fins and/or the stator, particularly adjacent to the fins (e.g., in locations along and trailing the fins). Moreover, the introduction of pressurized air into the mixing chamber 20 at a location where the seeds do not contact the fins 72 generally results in reducing the potential for exacerbated deposition of seed treatment formulation at the point of forced air delivery, providing for a directed air outlet preferentially onto the desired region of seed flow, and allowing for seeds to substantially cover all sections of the static surfaces which may otherwise collect deposited seed treatment formulation.

One advantage of the seed treater described herein is reduction of batch cycle time. For example, the use of pressurized air through the baffles 18 facilitate seed drying via forced convection, thereby reducing mixing time per batch. Also, for example, the treated seeds may be discharged more rapidly when the mixing chamber 20 has a positive pressure relative to ambient via the pressurized air being delivered into the mixing chamber.

Experiments have validated the benefits and advantages of the seed treater 10 having retractable fins and pressurized air delivered into the mixing chamber 20. Corn seed stock and soybean seed stock were treated in the seed treater 10. In the corn experiments, a treatment formulation was prepared consisting of three fungicides, one or more insecticides, a colorant, and a polymeric binder. In the soy experiments, a treatment formulation was prepared consisting of three fungicides, one or more insecticides, a colorant, and a polymeric binder.

Build-up was collected in a standard treatment operation and compared directly using the same treatment formulation with multiple experimental treatment operations, using the illustrated seed treater and the method set forth above in this section. In all cases, the build-up was reduced by between approximately 30% to 80% on the basis of 6 unit-scale sequential treatments, which provides a possible directional indicator of performance on much larger treatment sequences of hundreds of batches. The productivity (batches per unit time) was estimated to increase by between 9-18% based on these preliminary tests.

Seed Treatment Formulations

In some embodiments, the seed treatment formulation comprises a seed treatment active, such as a biological agent and/or agrochemical. In some embodiments, the seed treatment formulation comprises a seed-finishing agent suitable for enhancing one or more physical properties of the exterior surfaces of the seeds. The seed treatment formulations may be applied in a dry state or a wet state (e.g., slurry).

Seed Treatment Active

In the compositions described herein, the seed treatment formulations may comprise a seed treatment active comprising one or more biological agents and/or agrochemicals. After being contacted by the seed treatment active, for purposes herein, the seeds are referred to as "treated seeds."

In some embodiments, the seed treatment active comprises one or more pesticidal agents. Pesticidal agents include chemical pesticides and biopesticides or biocontrol agents. Various types of chemical pesticides and biopesticides include acaricides, insecticides, nematicides, fungicides, gastropodicides, herbicides, virucides, bactericides, and combinations thereof. Biopesticides or biocontrol agents may include bacteria, fungi, beneficial nematodes, and viruses that exhibit pesticidal activity.

Acaricides, Insecticides and/or Nematicides

In some embodiments, the seed treatment active comprises one or more chemical acaricides, insecticides, and/or nematicides. Non-limiting examples of chemical acaricides, insecticides, and/or nematicides may include one or more carbamates, diamides, macrocyclic lactones, neonicotinoids, organophosphates, phenylpyrazoles, pyrethrins, spinosyns, synthetic pyrethroids, tetronic acids and/or tetramic acids. Non-limiting examples of chemical acaricides, insecticides and nematicides that can be useful in compositions of the present disclosure include abamectin, acrinathrin, aldicarb, aldoxycarb, alpha-cypermethrin, betacyfluthrin, bifenthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl)

amino}furan-2(5H)-one, 3,5-disubstituted-1,2,4-oxadiazole compounds, 3-phenyl-5-(thien-2-yl)-1,2,4-oxadiazole, cadusaphos, carbaryl, carbofuran, ethoprophos, thiodicarb, aldicarb, aldoxycarb, metamidophos, methiocarb, sulfoxaflor, methamidophos, cyantraniliprole and tioxazofen and combinations thereof. Additional non-limiting examples of chemical acaricides, insecticides, and/or nematicides may include one or more of abamectin, aldicarb, aldoxycarb, bifenthrin, carbofuran, chlorantraniliporle, chlothianidin, cyfluthrin, cyhalothrin, cypermethrin, cyantraniliprole, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam, tioxazofen and/or thiodicarb, and combinations thereof Additional non-limiting examples of acaricides, insecticides and nematicides that may be included or used in seed treatment formulations in some embodiments may be found in Steffey and Gray, *Managing Insect Pests*, ILLINOIS AGRONOMY HANDBOOK (2008); and Niblack, *Nematodes*, ILLINOIS AGRONOMY HANDBOOK (2008), the contents and disclosures of which are incorporated herein by reference. Non-limiting examples of commercial insecticides which may be suitable for the seed treatment formulations disclosed herein include CRUISER (Syngenta, Wilmington, Delaware), GAUCHO and PONCHO (Gustafson, Plano, Texas). Active ingredients in these and other commercial insecticides may include thiamethoxam, clothianidin, and imidacloprid. Commercial acaricides, insecticides, and/or nematicides may be used in accordance with a manufacturer's recommended amounts or concentrations.

In some embodiments, the seed treatment active comprises one or more biopesticidal agents the presence and/or output of which is toxic to an acarid, insect and/or nematode. For example, the seed treatment active may comprise one or more of *Bacillus firmus* I-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43, and/or *Metarhizium anisopliae* BIO-1020, TAE-001; deposited as DSM 3884, DSM 3885, ATCC 90448, SD 170 and ARSEF 7711), *Paecilomyces fumosoroseus* FE991, and combinations thereof.

Fungicides

In some embodiments, the seed treatment active comprises one or more chemical fungicides. Non-limiting examples of chemical fungicides may include one or more aromatic hydrocarbons, benzthiadiazole, carboxylic acid amides, morpholines, phenylamides, phosphonates, thiazolidines, thiophene, quinone outside inhibitors and strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester, and 2-(2-(3-(2,6-dichlorophenyl)-1-methyl-allylideneaminooxymethyl)-phenyl)-2-methoxyimino-N-methyl-acetamide, carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, fenehexamid, oxytetracyclin, silthiofam, and N-(6-methoxy-pyridin-3-yl) cyclopropanecarboxylic acid amide, spiroxamine, azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pyrroles (e.g., fenpiclonil, fludioxonil), morpholines(e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydropyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methyl sulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxypyrimidin-2-yl)-2-methyl-1H-benzoimidazole and 5-chloro-7-(4-methylpiperidin-1-y1)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen). organometal compounds (e.g., fentin salts, such as fentin-acetate, fentin chloride, fentin hydroxide); sulfur-containing heterocyclyl compounds (e.g., dithianon, isoprothiolane), organophosphorus compounds (e.g., edifenphos, fosetyl, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanates, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof In an aspect, the seed treatment active comprises comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole, and combinations thereof.

For additional examples of fungicides that may be included in the seed treatment active formulations in some embodiments see, e.g., Bradley, *Managing Diseases*, ILLINOIS AGRONOMY HANDBOOK (2008), the content and disclosure of which are incorporated herein by reference. Fungicides useful for seed treatment formulations in some embodiments may include compounds that exhibit activity against one or more fungal plant pathogens, including but not limited to Phytophthora, Rhizoctonia, Fusarium, Pythium, Phomopsis, Selerotinia or Phakopsora, and combinations thereof. Non-limiting examples of commercial fungicides which may be suitable for the seed treatment formulations in some embodiments include PROTÉGÉ, RIVAL or ALLEGIANCE FL or LS (Gustafson, Plano, Texas), WARDEN RTA (Agrilance, St. Paul, Minnesota), APRON XL, APRON MAXX RTA or RFC, MAXIM 4FS or XL (Syngenta, Wilmington, Delaware), CAPTAN (Arvesta, Guelph, Ontario) and PROTREAT (Nitragin Argentina, Buenos Ares, Argentina). Active ingredients in these and other commercial fungicides include, but are not limited to, fludioxonil, mefenoxam, azoxystrobin and metalaxyl. Commercial fungicides may be used in accordance with a manufacturer's recommended amounts or concentrations.

In some embodiments, the seed treatment active comprises one or more biopesticidal agents the presence and/or output of which is toxic to at least one fungus and/or bacteria. For example, the seed treatment active may comprise one or more of *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* FZB42, *Bacillus amyloliquefaciens* NRRL B-50349, *Bacillus subtilis* ATCC 55078, *Bacillus subtilis* ATCC 55079, *Bacillus thuringiensis* AQ52 (NRRL B-21619), *Candida oleophila* I-182 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, N.C.), *Clonostachys rosea f catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo S SRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma vixens* GL-21 (SOILGARD®, Certis LLC, USA), and combinations thereof.

Herbicides

In some embodiments, the seed treatment active comprises one or more suitable chemical herbicides. The herbicides may be a pre-emergent herbicide, a post-emergent herbicide, or a combination thereof. Non-limiting examples of chemical herbicides may comprise one or more acetyl CoA carboxylase (ACCase) inhibitors, acetolactate synthase (ALS) inhibitors, acetanilides, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvylshikimate-3-phosphate (EPSP) synthase inhibitors, glutamine synthetase inhibitors, dihydropteroate synthetase inhibitors, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof. Non-limiting examples of chemical herbicides that can be useful in compositions of the present disclosure include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diflufenican, diuron, dithiopyr, ethofumesate, fenoxaprop, foramsulfuron, fluazifop, fluazifop-P, flufenacet, fluometuron, flufenpyr-ethyl, flumiclorac, flumiclorac-pentyl, flumioxazin, fluoroglycofen, fluthiacetmethyl, fomesafen, glyphosate, glufosinate, halosulfuron, haloxyfop, hexazinone, iodosulfuron, indaziflam, imazamox, imazaquin, imazethapyr, ioxynil, isoproturon, isoxaflutole, lactofen, linuron, mecoprop, mecoprop-P, mesosulfuron, mesotrion, metamitron, metazochlor, methibenzuron, metolachlor (and S-metolachlor), metoxuron, metribuzin, monolinuron, oxadiargyl, oxadiazon, oxaziclomefone, oxyfluorfen, phenmedipham, pretilachlor, profoxydim, prometon, prometrn, propachlor, propanil, propaquizafop, propisochlor, propoxycarbazone, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in U.S. Pat. No. 7,989,393), thiencarbazone-methyl, thenylchlor, tralkoxydim, triclopyr, trietazine, trifloxysulfuron, tropramezone, salts and esters thereof; racemic mixtures and resolved isomers thereof and combinations thereof In an embodiment, seed treatment active compositions comprise acetochlor, clethodim, dicamba, flumioxazin, fomesafen, glyphosate, glufosinate, mesotrione, quizalofop, saflufenacil, sulcotrione, S-3100 and/or 2,4-D, and combinations thereof.

Additional examples of herbicides that may be included in seed treatment formulations in some embodiments may be found in Hager, *Weed Management*, Illinois Agronomy Handbook (2008); and Loux et al., Weed Control Guide for Ohio, Indiana and Illinois (2015), the contents and disclosures of which are incorporated herein by reference. Commercial herbicides may be used in accordance with a manufacturer's recommended amounts or concentrations.

In some embodiments, the seed treatment active comprises one or more biopesticidal agents the presence and/or output of which is toxic to at least one plant, including for example, weeds. Examples of biopesticides that may be included or used in compositions in some embodiments may be found in BURGES, supra; HALL & MENN, BIOPESTICIDES: USE AND DELIVERY (Humana Press) (1998); McCoy et al., Entomogenous fungi, in CRC HANDBOOK OF NATURAL PESTICIDES. MICROBIAL PESTICIDES, PART A. ENTOMOGENOUS PROTOZOA AND FUNGI (C. M. Inoffo, ed.), Vol. 5:151-236 (1988); SAMSON et al., ATLAS OF ENTOMOPATHOGENIC FUNGI (Springer-Verlag, Berlin) (1988); and deFaria and Wraight, *Mycoinsecticides and Mycoacaricides: A comprehensive list with worldwide coverage and international classification of formulation types*, BIOL. CONTROL (2007), the contents and disclosures of which are incorporated herein by reference.

Additional Agents

In some embodiments, the seed treatment active comprises one or more additional agent.

In some embodiments, the seed treatment active comprises one or more beneficial biostimulants and/or microbial inoculants. Biostimulants or inoculants may enhance ion uptake, nutrient uptake, nutrient availability or delivery, or a combination thereof. Non-limiting examples of biostimulants or inoculants that may be included or used in compositions may include bacterial extracts (e.g., extracts of one or more diazotrophs, phosphate-solubilizing microorganisms and/or biopesticides), fungal extracts, humic acids (e.g., potassium humate), fulvic acids, myo-inositol, and/or glycine, and any combinations thereof. According to some embodiments, the biostimulants or inoculants may comprise one or more *Azospirillum* (e.g., an extract of media comprising *A. brasilense* INTA Az-39), one or more *Bradyrhizobium* (e.g., an extract of media comprising *B. elkanii* SEMIA 501, *B. elkanii* SEMIA 587, *B. elkanii* SEMIA 5019, *B. japonicum* NRRL B-50586 (also deposited as NRRL B-59565), *B. japonicum* NRRL B-50587 (also deposited as NRRL B-59566), *Bacillus amyloliquefaciens* TJ1000 (also known as 1BE, isolate ATCC BAA-390), *B. japonicum* NRRL B-50588 (also deposited as NRRL B-59567), *B. japonicum* NRRL B-50589 (also deposited as NRRL B-59568), *B. japonicum* NRRL B-50590 (also deposited as NRRL B-59569), *B. japonicum* NRRL B-50591 (also deposited as NRRL B-59570), *Trichoderma virens* G1-3 (ATCC 57678), *Trichoderma virens* G1-21 (Thermo Trilogy Corporation, Wasco, CA), *Trichoderma virens* G1-3 and *Bacillus amyloliquefaciens* FZB24, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., India, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ), *B. japonicum* NRRL B-50592 (also deposited as NRRL B-59571), *B. japonicum* NRRL B-50593 (also deposited as NRRL B-59572), *B. japonicum* NRRL B-50594 (also deposited as NRRL B-50493), *B. japonicum* NRRL B-50608, *B. japonicum* NRRL B-50609, *B. japonicum* NRRL B-50610, *B. japonicum* NRRL B-50611, *B. japonicum* NRRL B-50612, *B. japonicum* NRRL B-50726, *B. japonicum* NRRL B-50727, *B. japonicum* NRRL B-50728, *B. japonicum* NRRL B-50729, *B. japonicum* NRRL B-50730, *B. japonicum* SEMIA 566, *B. japonicum* SEMIA 5079, *B. japonicum* SEMIA 5080, *B. japonicum* USDA 6, *B. japonicum* USDA 110, *B. japonicum* USDA 122, *B. japonicum* USDA 123, *B. japonicum* USDA 127, *B. japonicum* USDA 129 and/or *B. japonicum* USDA 532C), one or more *Rhizobium* extracts (e.g., an extract of media comprising *R. leguminosarum* SO12A-2), one or more *Sinorhizobium* extracts (e.g., an extract of media comprising *S. fredii* CCBAU114 and/or *S. fredii* USDA 205), one or more *Penicillium* extracts (e.g., an extract of media comprising *P. bilaiae* ATCC 18309, *P. bilaiae* ATCC 20851, *P. bilaiae* ATCC 22348, *P. bilaiae* NRRL 50162, *P. bilaiae* NRRL 50169, *P. bilaiae* NRRL 50776, *P. bilaiae* NRRL 50777, *P. bilaiae* NRRL 50778, *P. bilaiae* NRRL 50777, *P. bilaiae* NRRL 50778, *P. bilaiae* NRRL 50779, *P. bilaiae* NRRL 50780, *P. bilaiae* NRRL 50781, *P. bilaiae* NRRL 50782, *P. bilaiae* NRRL 50783, *P. bilaiae* NRRL 50784, *P. bilaiae* NRRL 50785, *P. bilaiae* NRRL 50786, *P. bilaiae* NRRL 50787, *P. bilaiae* NRRL 50788, *P. bilaiae* RS7B-SD1, *P. brevicompactum* AgRF18, *P. canescens* ATCC 10419, *P. expansum* ATCC 24692, *P. expansum* YT02, *P. fellatanum* ATCC 48694, *P. gaestrivorus* NRRL 50170, *P. glabrum* DAOM 239074, *P. glabrum* CBS 229.28, *P. janthinellum* ATCC 10455, *P. lanosocoeruleum* ATCC 48919, *P. radicum* ATCC 201836, *P. radicum* FRR 4717, *P. radicum* FRR 4719, *P. radicum* N93/47267 and/or *P. raistrickii* ATCC 10490), one or more *Pseudomonas* extracts (e.g., an extract of media comprising *P. jessenii* PS06), one or more acaricidal, insecticidal and/or nematicidal extracts (e.g., an extract of media comprising *Bacillus firmus* I-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43 and *Metarhizium anisopliae* BIO-1020, TAE-001; deposited as DSM 3884, DSM 3885, ATCC 90448, SD 170 and ARSEF 7711) and/or *Paecilomyces fumosoroseus* FE991), and/or one or more fungicidal extracts (e.g., an extract of media comprising *Ampelomyces quisqualis* AQ 10® (Intrachem Bio GmbH &

Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* NRRL B-50349, *Bacillus amyloliquefaciens* TJ1000 (also known as 1BE, isolate ATCC BAA-390), *Bacillus thuringiensis* AQ52 (NRRL B-21619), *Candida oleophila* I-82 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, NC), *Clonostachys rosea* f *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone Biolnnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma virens* GL-21 (SOILGARD®, Certis LLC, USA), *Trichoderma virens* G1-3, ATCC 57678, *Trichoderma virens* G1-21 (Thermo Trilogy Corporation, Wasco, CA), *Trichoderma virens* G1-3 and *Bacillus amyloliquefaciens* FZB2, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., Indien, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ)), and combinations thereof.

In some embodiments, the seed treatment active comprises one or more beneficial microbes. Non-limiting examples of such microbes include beneficial microbes selected from the following genera: *Actinomycetes, Agrobacterium, Arthrobacter, Alcaligenes, Acinetobacter* spp, *Azospirillum* spp, *Aureobacterium, Azobacter, Azorhizobium, Bacillus, Beijerinckia, Bradyrhizobium, Brevibacillus, Burkholderia, Chromobacterium, Chryseomonas* spp., *Clostridium, Clavibacter, Comamonas, Corynebacterium, Curtobacterium, Enterobacter, Eupenicillium* spp., *Exiguobacterium* spp., *Flavobacterium, Gluconobacter, Hydrogenophaga, Hymenoscyphous, Klebsiella, Kluyvera* spp., *Methylobacterium, Paenibacillus, Pasteuria, Photorhabdus, Phyllobacterium, Pseudomonas, Rhizobium, Rhizobacter, Rhizopogon, Serratia, Sinorhizobium, Sphingobacterium, Swaminathania* spp., *Stenotrophomonas, Streptomyces* spp., *Thiobacillus, Variovorax, Vibrio, Xanthobacter, Xanthomonas* and *Xenorhabdus*, or any combination thereof. According to some embodiments, the seed treatment active comprises one or more of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Chromobacterium subtsugae, Pasteuria penetrans, Pasteuria usage,* and *Pseudomona fluorescens*. According to some embodiments, a microbe may comprise a fungus of the genus *Alternaria, Ampelomyces, Arthrobotrys* spp., *Aspergillus, Aureobasidium, Beauveria, Candida* spp., *Colletotrichum, Coniothyrium, Gigaspora* spp., *Gliocladium, Glomus* spp., *Laccaria* spp., *Metarhizium, Mucor* spp., *Muscodor, Oidiodendron* spp., *Paecilomyces, Penicillium* spp., *Pisolithus* spp., *Scleroderma, Trichoderma, Typhula, Ulocladium,* and *Verticillium*. In another aspect, a fungus is *Beauveria bassiana, Coniothyrium minitans, Gliocladium vixens, Muscodor albus, Paecilomyces lilacinus,* or *Trichoderma polysporum*.

In some embodiments, the seed treatment active comprises one or more lipo-chitooligosaccharides (LCDs), chitin oligomer(s) and/or chitosan oligomer(s) (collectively referred to hereinafter as COs), and/or chitinous compounds.

LCOs, sometimes referred to as symbiotic nodulation (Nod) signals (or Nod factors) or as Myc factors, consist of an oligosaccharide backbone of β-1,4-linked N-acetyl-D-glucosamine ("GlcNAc") residues with an N-linked fatty acyl chain condensed at the non-reducing end. As understood in the art, LCOs differ in the number of GlcNAc residues in the backbone, in the length and degree of saturation of the fatty acyl chain and in the substitutions of reducing and non-reducing sugar residues. See, e.g., Denarie et al., Ann. Rev. Biochem. 65:503 (1996); Diaz et al., Mol. Plant-Microbe Interactions 13:268 (2000); Hungria et al., Soil Biol. Biochem. 29:819 (1997); Hamel et al., Planta 232:787 (2010); and Prome et al., Pure & Appl. Chem. 70(1):55 (1998), the contents and disclosures of which are incorporated herein by reference.

LCOs may be synthetic or obtained from any suitable source. See, e.g., WO 2005/063784, WO 2007/117500 and WO 2008/071674, the contents and disclosures of which are incorporated herein by reference. In some aspects, a synthetic LCO may have the basic structure of a naturally occurring LCO but contains one or more modifications or substitutions, such as those described in Spaink, Crit. Rev. Plant Sci. 54:257 (2000). LCOs and precursors for the construction of LCOs (e.g., COs, which may themselves be useful as a biologically active ingredient) can be synthesized by genetically engineered organisms. See, e.g., Samain et al., *Carbohydrate Res.* 302:35 (1997); Cottaz et al., *Meth. Eng.* 7(4):311 (2005); and Samain et al., *J. Biotechnol.* 72:33 (1999) (e.g., FIG. 1 therein, which shows structures of COs that can be made recombinantly in *E. coli* harboring different combinations of genes nodBCHL), the contents and disclosures of which are incorporated herein by reference.

LCOs (and derivatives thereof) may be included or utilized in compositions in various forms of purity and can be used alone or in the form of a culture of LCO-producing bacteria or fungi. For example, OPTIMIZE® (commercially available from Monsanto Company (St. Louis, MO)) contains a culture of *Bradyrhizobium japonicum* that produces LCO. Methods to provide substantially pure LCOs include removing the microbial cells from a mixture of LCOs and the microbe, or continuing to isolate and purify the LCO molecules through LCO solvent phase separation followed by HPLC chromatography as described, for example, in U.S. Pat. No. 5,549,718. Purification can be enhanced by repeated HPLC and the purified LCO molecules can be freeze-dried for long-term storage. According to some embodiments, the LCO(s) included in compositions of the present disclosure is/are at least 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% pure. Compositions and methods in some embodiments may comprise analogues, derivatives, hydrates, isomers, salts and/or solvates of LCOs. LCOs may be incorporated into compositions of the present disclosure in any suitable amount(s)/concentration(s). For example, compositions of the present disclosure comprise about $1\times10^{-20}$ M to about $1\times10^4$ M LCO(s). For example, compositions of the present disclosure can comprise about $1\times10^{-20}$ M, $1\times10^{-19}$ M, $1\times10^{48}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{41}$ M, $1\times10^{40}$ M, $1\times10^{-9}$ M, $1\times10^{-8}$ M, $1\times10^{-7}$ M, $1\times10^{-6}$ M, $1\times10^{-5}$ M, $1\times10^4$ M, $1\times10^{-3}$ M, $1\times10^{-2}$ M, $1\times10^4$ M of one or more LCOs. In an aspect, the LCO concentration is $1\times10^{44}$ M to $1\times10^{-5}$ M, $1\times10^{-12}$ M to $1\times10^{-6}$ M, or $1\times10^{40}$ M to $1\times10^{-7}$ M. In an aspect, the LCO concentration is $1\times10^{-14}$ M to $1\times10^{-5}$ M, $1\times10^{-12}$ M to $1\times10^{-6}$ M, or $1\times10^{40}$ M to $1\times10^{-7}$ M. The amount/concentration of LCO may be an amount effective to impart a positive trait or benefit to a plant, such as to enhance the disease resistance, growth and/or yield of the plant to which the composition is applied. According to some embodiments, the LCO amount/concentration is not effective to enhance the yield of the plant without beneficial contributions from one or more other constituents of the composition, such as CO and/or one or more pesticides.

In some embodiments, the seed treatment active comprises one or more chitin oligomers and/or chitosan oligomers. See, e.g., D'Haeze et al., *Glycobiol.* 12(6):79R (2002); Demont-Caulet et al., *Plant Physiol.* 120(1):83 (1999); Hanel et al., *Planta* 232:787 (2010); Muller et al., *Plant Physiol.* 124:733 (2000); Robina et al., *Tetrahedron* 58:521-530 (2002); Rouge et al., Docking of Chitin Oligomers and Nod Factors on Lectin Domains of the LysM-RLK Receptors in the Medicago-Rhizobium Symbiosis, in The Molecular Immunology of Complex Carbohydrates-3 (Springer Science, 2011); Van der Holst et al., *Curr. Opin. Struc. Biol.* 11:608 (2001); and Wan et al., *Plant Cell* 21:1053 (2009), the contents and disclosures of which are incorporated by reference. COs may be obtained from any suitable source. For example, COs may be derived from an LCO. For example, in an aspect, compositions comprise one or more COs derived from an LCO obtained (i.e., isolated and/or purified) from a strain of *Azorhizobium*, *Bradyrhizobium* (e.g., *B. japonicum*), *Mesorhizobium*, *Rhizobium* (e.g., *R. leguminosarum*), *Sinorhizobium* (e.g., *S. meliloti*), or mycorhizzal fungi (e.g., *Glomus intraradicus*). Alternatively, the CO may be synthetic. Methods for the preparation of recombinant COs are known in the art. See, e.g., Cottaz et al., *Meth. Eng.* 7(4):311 (2005); Samain et al., *Carbohydrate Res.* 302:35 (1997); and Samain et al., *J. Biotechnol.* 72:33 (1999), the contents and disclosures of which are incorporated herein by reference.

COs (and derivatives thereof) may be included or utilized in compositions in various forms of purity and can be used alone or in the form of a culture of CO-producing bacteria or fungi. According to some embodiments, the CO(s) included in compositions may be at least 0.1%, 0.5%, 1%, 2%, 3%, 4%, 5%, 6%, 7%, 8%, 9%, 10%, 15%, 20%, 30%, 40%, 50%, 60%, 70%, 75%, 80%, 85%, 90%, 91%, 92%, 93%, 94%, 95%, 96%, 97%, 98%, 99%, 99.5% or more pure. It is to be understood that compositions and methods of the present disclosure can comprise hydrates, isomers, salts and/or solvates of COs. COs in some embodiments may be incorporated into compositions in any suitable amount(s)/concentration(s). For example, compositions in some embodiments may comprise about $1\times10^{-20}$ M to about $1\times10^1$ M COs, such as about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, or $1\times10^{-1}$ M of one or more COs. For example, the CO concentration may be $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of CO may be an amount effective to impart or confer a positive trait or benefit to a plant, such as to enhance the soil microbial environment, nutrient uptake, or increase the growth and/or yield of the plant to which the composition is applied. Compositions in some embodiments may comprise one or more suitable chitinous compounds, such as, for example, chitin (IUPAC: N-[5-[[3-acetylamino-4,5-dihydroxy-6-(hydroxymethypoxan-2yl]methoxymethyl]-2-[[5-acetylamino-4,6-dihydroxy-2-(hydroxymethyl)oxan-3-yl]methoxymethyl]-4-hydroxy-6-(hydroxymethyl)oxan-3-ys]ethanamide), chitosan (IUPAC: 5-amino-6-[5-amino-6-[5-amino-4,6-dihydroxy-2(hydroxymethyl)oxan-3-yl]oxy-4-hydroxy-2-(hydroxymethyl)oxan-3-yl]oxy-2 (hydroxymethyl)oxane-3,4-diol), and isomers, salts and solvates thereof.

Chitins and chitosans, which are major components of the cell walls of fungi and the exoskeletons of insects and crustaceans, are composed of GlcNAc residues. Chitins and chitosans may be obtained commercially or prepared from insects, crustacean shells, or fungal cell walls. Methods for the preparation of chitin and chitosan are known in the art. See, e.g., U.S. Pat. No. 4,536,207 (preparation from crustacean shells) and U.S. Pat. No. 5,965,545 (preparation from crab shells and hydrolysis of commercial chitosan); and Pochanavanich et al., *Lett. Appl. Microbiol.* 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

In some embodiments, the seed treatment active comprises one or more suitable flavonoids, including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof. Flavonoids are phenolic compounds having the general structure of two aromatic rings connected by a three-carbon bridge. Classes of flavonoids are known in the art. See, e.g., Jain et al., *J. Plant Biochem. & Biotechnol.* 11:1 (2002); and Shaw et al., *Environ. Microbiol.* 11:1867 (2006), the contents and disclosures of which are incorporated herein by reference. Several flavonoid compounds are commercially available. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, See, e.g. Ralston et al., *Plant Physiol.* 137:1375 (2005).

In some embodiments, the seed treatment active comprises one or more flavanones, such as one or more of butin, eriodictyol, hesperetin, hesperidin, homoeriodictyol, isosakuranetin, naringenin, naringin, pinocembrin, poncirin, sakuranetin, sakuranin, and/or sterubin, one or more flavanonols, such as dihydrokaempferol and/or taxifolin, one or more flavans, such as one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins), one or more isoflavonoids, such as one or more isoflavones or flavonoid derivatives (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans, roetonoids, neoflavonoids (e.g, calophyllolide, coutareagenin, dalbergichromene, dalbergin, nivetin), and/or pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin), and combinations thereof. Flavonoids and their derivatives may be included in compositions in any suitable form, including, but not limited to, polymorphic and crystalline forms. Flavonoids may be included in compositions in any suitable amount(s) or concentration(s). The amount/concentration of a flavonoid(s) may be an amount effective, which may be indirectly through activity on soil microorganisms or other means, such as to enhance plant nutrition and/or yield. According to some embodiments, a flavonoid amount/concentration may not be effective to enhance the nutrition or yield of the plant without the beneficial contributions from one or more other ingredients of the composition, such as LCO, CO, and/or one or more pesticides.

In some embodiments, the seed treatment active comprises one or more non-flavonoid nod-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and/or linolenic acid ((Z,Z,Z)-9,12,15-octadecatrienoic acid), and analogues, derivatives, hydrates, isomers, polymers, salts and solvates thereof. Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromas, Gibbrella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid.

Derivatives of jasmonic acid, linoleic acid, and linolenic acid that may be included or used in compositions in some embodiments include esters, amides, glycosides and salts thereof. Representative esters are compounds in which the carboxyl group of linoleic acid, linolenic acid, or jasmonic acid has been replaced with a ——COR group, where R is an ——OW group, in which $R_1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a ——COR group, where R is an $NR^2R^3$ group, in which $R^2$ and $R^3$ are each independently: a hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent, such as dicyclohexyl carbodiimide (DCC), under neutral conditions. Suitable salts of linoleic acid, linolenic acid and jasmonic acid include, for example, base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing a solution of linoleic acid, linolenic acid, or jasmonic acid with a solution of the base. The salts may be precipitated from solution and collected by filtration, or may be recovered by other means such as by evaporation of the solvent.

In some embodiments, the seed treatment active comprises one or more plant growth regulators including, but not limited to, ethephon and/or thidiazuron.

In some embodiments, the seed treatment active comprises one or more karrakins, including but not limited to 2H-furo[2,3-c]pyran-2-ones, as well as analogues, derivatives, hydrates, isomers, polymers, salts and solvates thereof. Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Karrakins may be incorporated into compositions in any suitable amount(s) or concentration(s). For example, the amount/concentration of a karrakin may be an amount or concentration effective to impart or confer a positive trait or benefit to a plant, such as to enhance the disease resistance, growth and/or yield of the plant to which the composition is applied. In an aspect, a karrakin amount/concentration may not be effective to enhance the disease resistance, growth and/or yield of the plant without beneficial contributions from one or more other ingredients of the composition, such as a LCO, CO and/or one or more pesticides.

In some embodiments, the seed treatment active comprises one or more anthocyanidins and/or anthoxanthins, such as one or more of cyanidin, delphinidin, malvidin, pelargonidin, peonidin, petunidin, flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhamnazin, rhamnetin, robinin, rutin, spiraeoside, troxerutin and/or zanthorhamnin), and combinations thereof.

In some embodiments, the seed treatment active comprises one or more gluconolactone and/or an analogue, derivative, hydrate, isomer, polymer, salt and/or solvate thereof. Gluconolactone may be incorporated into compositions in any suitable amount(s)/concentration(s). For example, the amount/concentration of a gluconolactone amount/concentration may be an amount effective to impart or confer a positive trait or benefit to a plant, such as to enhance the disease resistance, growth and/or yield of the plant to which the composition is applied. In an aspect, the gluconolactone amount/concentration may not be effective to enhance the disease resistance, growth and/or yield of the plant without beneficial contributions from one or more other ingredients of the composition, such as a LCO, CO and/or one or more pesticides.

In some embodiments, the seed treatment active comprises one or more nutrient(s) and/or fertilizer(s), such as organic acids (e.g., acetic acid, citric acid, lactic acid, malic acid, taurine, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K.), and/or carotenoids (α-carotene, β-carotene, cryptoxanthin, lutein, lycopene, zeaxanthin, etc.), and combinations thereof. In an aspect, compositions of the present disclosure may comprise macro-and micronutrients of plants or microbes, including phosphorous, boron, chlorine, copper, iron, manganese, molybdenum and/or zinc. According to some embodiments, compositions may comprise one or more beneficial micronutrients. Non-limiting examples of micronutrients for use in compositions described herein may include vitamins, (e.g., vitamin A, vitamin B complex (i.e., vitamin B1, vitamin B2, vitamin B3, vitamin B5, vitamin B6, vitamin B7, vitamin B8, vitamin B9, vitamin B12, choline) vitamin C, vitamin D, vitamin E, vitamin K, carotenoids (α-carotene, β-carotene, cryptoxanthin, lutein, lycopene, zeaxanthin, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), organic acids (e.g., acetic acid, citric acid, lactic acid, malic aclid, taurine, etc.), and combinations thereof. In a particular aspect, compositions may comprise phosphorous, boron, chlorine, copper, iron, manganese, molybdenum, and/or zinc, and combinations thereof. For compositions comprising phosphorous, it is envisioned that any suitable source of phosphorous may be used. For example, phosphorus may be derived from a rock phosphate source, such as monoammonium phosphate, diammonium phosphate, monocalcium phosphate, super phosphate, triple super phosphate, and/or ammonium polyphosphate, an organic phosphorous source, or a phosphorous source capable of solubilization by one or more microorganisms (e.g., *Penicillium bilaiae*).

In view of the above, it will be seen that several advantageous results are obtained.

Having described the invention in detail, it will be apparent that modifications and variations are possible without departing from the scope of the invention defined in the appended claims.

When introducing elements of the embodiment(s), the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A seed treater comprising:
   a treater body defining a mixing chamber in which seeds and seed treatment formulations are mixed, the mixing chamber having a vertical axis, wherein the treater body includes
      a stator having an annular upper inner surface extending around the vertical axis of the mixing chamber and defining an upper portion of the mixing chamber, and
      a rotor having a generally concave inner surface below the annular upper inner surface of the stator and defining a lower portion of the mixing chamber, wherein the rotor is rotatable relative to the stator about the vertical axis of the mixing chamber so that seeds within the lower portion of the mixing chamber flow upward along the generally concave inner surface to the annular upper inner surface of the stator; and
   a baffle coupled to the treater body, wherein the baffle includes a fin that is selectively movable relative to the treater body and the mixing chamber to adjust an extent to which the fin extends into the mixing chamber during said mixing of the seeds and the seed treatment formulations within the mixing chamber to facilitate mixing of the seeds and the seed treatment formulations within the mixing chamber.

2. The seed treater set forth in claim 1, wherein the treater body further includes a lid, wherein the baffle is coupled to the lid.

3. The seed treater set forth in claim 2, wherein the fin is selectively movable in a vertical direction to adjust an extent to which the fin extends into the mixing chamber during said mixing of the seeds and the seed treatment formulations within the mixing chamber.

4. The seed treater set forth in claim 3, wherein a radially outer face of the fin generally opposes the upper inner annular surface of the stator when the fin extends into the mixing chamber.

5. The seed treater set forth in claim 3, wherein a radially outer face of the fin is offset concentrically from the upper inner annular surface of the stator when the fin extends into the mixing chamber, such that one or more layers of seed may flow through an annulus between the radially outer face of the fin and the stator.

6. The seed treater set forth in claim 2, wherein in a fully retracted position, a bottom surface of the fin is generally flush with an upper inner surface of the lid.

7. The seed treater set forth in claim 1, wherein the baffle further includes a stop fixedly coupled to and movable with the fin, wherein the stop and the fin define a baffle body, and the stop is configured to engage the treater body when the fin is fully extended into the mixing chamber.

8. The seed treater set forth in claim 1, wherein the baffle includes a baffle guide fixedly secured to the treater body and operatively coupled to the fin to guide the fin into the mixing chamber as the fin is selectively moved relative to the treater body and the mixing chamber.

9. The seed treater set forth in claim 1, wherein the baffle includes a baffle actuator operatively coupled to the fin and configured to move the fin relative to the treater body and the mixing chamber.

10. The seed treater set forth in claim 1, wherein the fin defines an internal flow passage configured to deliver forced fluid through the fin and into the mixing chamber.

11. The seed treater set forth in claim 10, wherein the fin includes a leading circumferential end, a trailing circumferential end, and a radially inner face extending between the leading and trailing circumferential ends, wherein the trailing circumferential end defines an outlet of the internal flow passage.

12. The seed treater set forth in claim 1, wherein the fin includes a leading circumferential end, a trailing circumferential end, and a radially inner face extending between the leading and trailing circumferential ends, wherein the radially inner face curves generally inward toward the vertical axis of the mixing chamber adjacent the leading circumferential end toward the trailing circumferential end.

13. The seed treater set forth in claim 1, further comprising a controller configured to control movement of the fin relative to the treater body and the mixing chamber.

14. A seed treater comprising:
a treater body defining a mixing chamber, having a vertical axis, in which seeds and seed treatment are mixed, the treater body including
a stator having an annular upper inner surface extending around the vertical axis of the mixing chamber and defining an upper portion of the mixing chamber, and
a rotor having a generally concave inner surface below the annular upper inner surface of the stator and defining a lower portion of the mixing chamber, wherein the rotor is rotatable relative to the stator about the vertical axis of the mixing chamber so that seeds within the lower portion of the mixing chamber flow upward along the generally concave inner surface to the annular upper inner surface of the stator; and
a baffle coupled to the treater body and including a fin configured to facilitate mixing of the seeds and the seed treatment within the mixing chamber, wherein the fin defines an internal flow passage configured to deliver forced fluid through the fin and into the mixing chamber.

15. The seed treater set forth in claim 14, wherein the fin includes a leading circumferential end, a trailing circumferential end, and a radially inner face extending between the leading and trailing circumferential ends, wherein the trailing circumferential end defines an outlet of the internal flow passage.

16. The seed treater set forth in claim 15, wherein the outlet of the internal flow passage is configured to direct the forced fluid downward toward the rotor.

17. The seed treater set forth in claim 15, further comprising a source of forced fluid in fluid communication with the internal flow passage, and a controller configured to control delivery of forced fluid from the source of forced fluid into the mixing chamber.

18. A method of treating seeds comprising:
loading seeds into a mixing chamber of a body of a seed treater having a generally vertical axis, the body including an upper stator having an annular inner surface extending around the vertical axis of the mixing chamber and defining an upper portion of the mixing chamber, and a lower rotor having a generally concave inner surface defining a lower portion of the mixing chamber;
rotating the lower rotor of the mixing chamber relative to the upper stator about the vertical axis so that the seeds within the mixing chamber flow upward along the generally concave inner surface to the annular inner surface of the upper stator;
delivering a seed treatment formulation into the mixing chamber; and
at least one of: retracting a baffle relative to the mixing chamber, and extending a baffle relative to the mixing chamber.

19. The method of treating seeds set forth in claim 18, further comprising delivering forced fluid through the baffle and into the mixing chamber.

20. The method of treating seeds set forth in claim 19, further comprising discharging the seeds from the mixing chamber during said delivering forced fluid through the baffle and into the mixing chamber.

* * * * *